(12) United States Patent
Ryu et al.

(10) Patent No.: US 12,389,296 B2
(45) Date of Patent: Aug. 12, 2025

(54) SESSION MANAGEMENT FOR EDGE COMPUTING

(71) Applicant: Ofinno, LLC, Reston, VA (US)

(72) Inventors: Jinsook Ryu, Oakton, VA (US); Esmael Hejazi Dinan, McLean, VA (US); Kyungmin Park, Vienna, VA (US); Peyman Talebi Fard, Vienna, VA (US); Hyukjin Chae, San Diego, CA (US)

(73) Assignee: Ofinno, LLC, Reston, VA (US)

( * ) Notice: Subject to any disclaimer, the term of this patent is extended or adjusted under 35 U.S.C. 154(b) by 266 days.

(21) Appl. No.: 17/895,572

(22) Filed: Aug. 25, 2022

(65) Prior Publication Data
US 2022/0408333 A1    Dec. 22, 2022

Related U.S. Application Data

(63) Continuation of application No. PCT/US2021/020247, filed on Mar. 1, 2021.

(60) Provisional application No. 62/982,507, filed on Feb. 27, 2020.

(51) Int. Cl.
*H04W 36/22*      (2009.01)
*H04L 67/141*     (2022.01)
*H04W 76/10*      (2018.01)

(52) U.S. Cl.
CPC ........... *H04W 36/22* (2013.01); *H04L 67/141* (2013.01); *H04W 76/10* (2018.02)

(58) Field of Classification Search
CPC ..... H04W 36/22; H04W 76/10; H04W 76/12; H04W 48/18; H04W 88/14; H04L 67/141; H04L 67/146
See application file for complete search history.

(56) References Cited

U.S. PATENT DOCUMENTS

| | | | |
|---|---|---|---|
| 10,037,231 | B1 | 7/2018 | Jakhetiya et al. |
| 10,390,275 | B2 | 8/2019 | Liu et al. |
| 10,440,096 | B2 | 10/2019 | Sabella et al. |
| 2017/0064037 | A1 | 3/2017 | Das et al. |
| 2018/0183855 | A1 | 6/2018 | Sabella et al. |
| 2018/0192390 | A1 | 7/2018 | Li et al. |

(Continued)

FOREIGN PATENT DOCUMENTS

| | | |
|---|---|---|
| CN | 109417731 A | 1/2019 |
| CN | 110474969 A | 11/2019 |

(Continued)

OTHER PUBLICATIONS

WO2021062738A1—English Translated (Year: 2024).*

(Continued)

*Primary Examiner* — Ji-Hae Yea

(74) *Attorney, Agent, or Firm* — Reese Bastian; Kavon Nasabzadeh; Jacob L. Mangan

(57) ABSTRACT

A session management function (SMF) receives, from a wireless device, a packet data unit (PDU) session establishment request message requesting establishment of a PDU session associated with an application and offloaded processing of data from the wireless device to an application server associated with the application. The SMF sends, to the wireless device, a response message indicating a rejection or an acceptance of the offloaded processing of data.

20 Claims, 25 Drawing Sheets

(56) References Cited

U.S. PATENT DOCUMENTS

| | | |
|---|---|---|
| 2019/0045421 A1 | 2/2019 | Shah et al. |
| 2019/0253917 A1 | 8/2019 | Dao |
| 2019/0288934 A1 | 9/2019 | Chakra et al. |
| 2019/0357301 A1 | 11/2019 | Li et al. |
| 2019/0394833 A1 | 12/2019 | Talebi Fard et al. |

FOREIGN PATENT DOCUMENTS

| | | | | |
|---|---|---|---|---|
| CN | 111083737 A | 4/2020 | | |
| EP | 2559199 B1 | 5/2018 | | |
| WO | 2017/067586 A1 | 4/2017 | | |
| WO | WO-2019028838 A1 * | 2/2019 | ............ | H04W 68/02 |
| WO | WO-2019137547 A1 * | 7/2019 | ............. | H04L 29/08 |
| WO | 2019/148188 A1 | 8/2019 | | |
| WO | WO-2020034844 A1 * | 2/2020 | ......... | H04L 43/0882 |
| WO | WO-2021062738 A1 * | 4/2021 | | |

OTHER PUBLICATIONS

WO2019137547A1—English Translated (Year: 2024).*
WO2020034844A1—English Translated (Year: 2024).*
3GPP TS 23.501 V16.4.0 (Mar. 2020); Technical Specification; 3rd Generation Partnership Project; Technical Specification Group Services and System Aspects; System architecture for the 5G System (5GS); Stage 2; (Release 16).
3GPP TS 23.502 V16.4.0 (Mar. 2020); Technical Specification; 3rd Generation Partnership Project; Technical Specification Group Services and System Aspects; Procedures for the 5G System (5GS); Stage 2; (Release 16).
3GPP TR 23.748 V0.2.0 (Nov. 2019); Technical Report 3rd Generation Partnership Project; Technical Specification Group Services and System Aspects; Study on enhancement of support for Edge Computing in the 5G Core network (5GC); (Release 17).
3GPP TR 23.758 V2.0.0 (Dec. 2019); Technical Report; 3rd Generation Partnership Project; Technical Specification Group Services and System Aspects; Study on application architecture for enabling Edge Applications; (Release 17).
3GPP TS 24.193 V1.0.1 (Dec. 2019); Technical Specification; 3rd Generation Partnership Project; Technical Specification Group Core Network and Terminals; 5G System; Access Traffic Steering, Switching and Splitting (ATSSS); Stage 3; (Release 16).
3GPP TR 28.803 V16.0.1 (Sep. 2019); Technical Report; 3rd Generation Partnership Project; Technical Specification Group Services and System Aspects; Telecommunication management; Study on management aspects of edge computing; (Release 16).
SP-190065; 3GPP TSG-SA Meeting #83; Shenzhen, China, Mar. 20-22, 2019; Source: TSG SA WG6; Title: New SID on Application Architecture for enabling Edge Applications; Document for: Approval; Agenda Item: 19.
SP-190185; TSG SA Meeting #SP-83; Mar. 20-22, 2019, Shenzhen, China; S2-1902931; SA WG2 Meeting #S2-131; Feb. 25-Mar. 1, 2019, Santa Cruz—Tenerife; (e-mail revision 6 of S2-1902838); Source: SA WG2; Title: New SID: Study on enhancement of support for Edge Computing in 5GC; Document for: Approval; Agenda Item: 19.
Mobile Edge Computing (MEC); End to End Mobility Aspects; ETSI GR MEC 018 V1.1.1 (Oct. 2017); ETSI 2017.
Badmus et al.; Network Slice Instantiation for 5G Micro-Operator Deployment Scenarios; 2019 European Conference on Networks and Communications (EuCNC); Jun. 18-21, 2019; Valencia, Spain.
Sabella et al.; Toward fully connected vehicles: Edge computing for advanced automotive communications; White Paper; 5GAA Automotive Association; Dec. 15, 2017.
Mach et al.; Mobile Edge Computing: A Survey on Architecture and Computation Offloading; IEEE Communications Surveys & Tutorials (vol. 19, Issue: 3, thirdquarter 2017); pp. 1628-1656; Mar. 15, 2017.
Kekki et al.; MEC in 5G networks; ETSI White Paper No. 28; First edition—Jun. 2018; ETSI 2018.
Messaoudi et al.; On using Edge Computing for computation offloading in mobile network; Globecom 2017—2017 IEEE Global Communications Conference; Dec. 4-8, 2017; IEEE; Singapore.
International Search Report and Written Opinion of the International Searching authority mailed Jun. 25, 2021, in International Application No. PCT/US2021/020247.
3GPP TS 23.501 V16.3.0 (Dec. 2019); Technical Specification; 3rd Generation Partnership Project; Technical Specification Group Services and System Aspects; System architecture for the 5G System (5GS); Stage 2; (Release 16).
3GPP TR 26.891 V16.0.0 (Dec. 2018); Technical Specification; 3rd Generation Partnership Project; Technical Specification Group Services and System Aspects; 5G enhanced mobile broadband; Media distribution; (Release 16).
Wang et al., HetMEC: Latency-Optimal Task Assignment and Resource Allocation for Heterogeneous Multi-Layer Mobile Edge Computing; IEEE Transactions on Wireless Communications, IEEE Service Center, Piscataway, NJ, US, vol. 18, No. 10; Oct. 1, 2019.
Wang et al.; HetMEC: Latency-optimal Task Assignment and Resource Allocation for Heterogeneous Mobile Edge Computing; arxiv.org, Cornell University Library, Ithaca, NY, US; Jan. 27, 2019.
Doan et al.; MEC-assisted Immersive Services: Orchestration Framework and Protocol; 2019 IEEE International Symposium on Broadband Multimedia Systems and Broadcasting (BMSB); Jun. 5-7, 2019; IEEE; Jeju, Korea.
3GPP TR 23.726 V16.0.0 (Dec. 2018); 3rd Generation Partnership Project; Technical Specification Group Services and System Aspects; Study on Enhancing Topology of SMF and UPF in 5G Networks; (Release 16).
Extended European Search Report mailed May 15, 2025 in EP Patent Application No. 24212588.8.
S2-1907695; 3GPP TSG-SA WG2 Meeting #134; Jun. 24-28, 2019, Sapporo, Japan; (revision of S2-195390); Source: Nokia, Nokia Shanghai Bell; Title: Using AF influence mechanism for V2X Application Server discovery; Document for: Approval; Agenda Item: 6.6; Work Item I Release: eV2XARC / R16.
Chinese Office Action mailed Jun. 19, 2025 in CN Patent Application No. 2021800173831.
S2-172445 (Revision of S2-171979—wrong document uploaded—revised to S2-172835); SA WG2 Meeting #120; Mar. 26-31, 2017, Busan, South Korea; Source: Motorola Mobility, Lenovo; Title: Indicate to UE when a PDU session starts/stops providing access to a local DN; Document for: Approval; Agenda Item: 6.5.3; Work Item / Release: 5GS_ph1 / Rel-15.

* cited by examiner

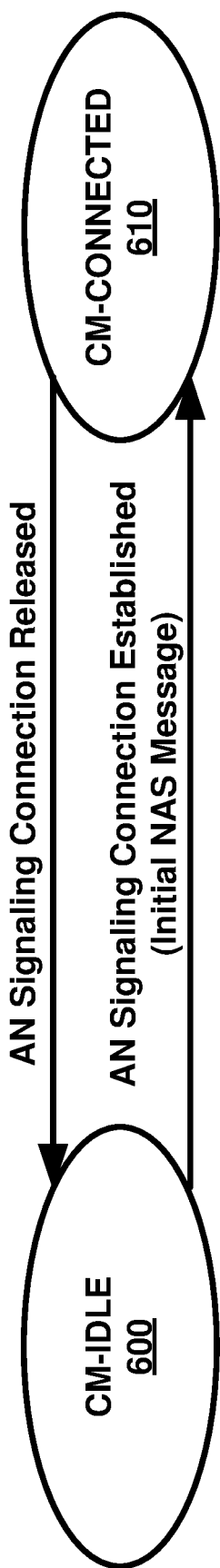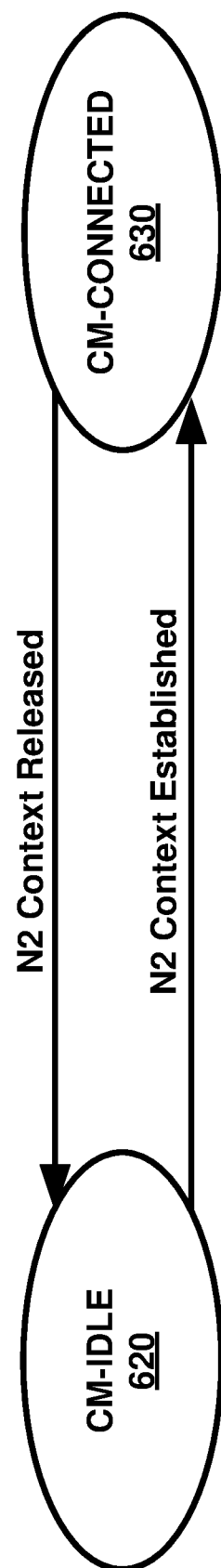

SESSION MANAGEMENT FOR EDGE COMPUTING

CROSS-REFERENCE TO RELATED APPLICATIONS

This application is a continuation of International Patent Application No. PCT/US2021/020247, filed 1 Mar. 2021, which claims the benefit of U.S. Provisional Application No. 62/982,507, filed 27 Feb. 2020, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 6A and FIG. 6B depict two connection management state models in UE 100 and AMF 155 as per an aspect of embodiments of the present disclosure.

DETAILED DESCRIPTION OF EXAMPLES

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
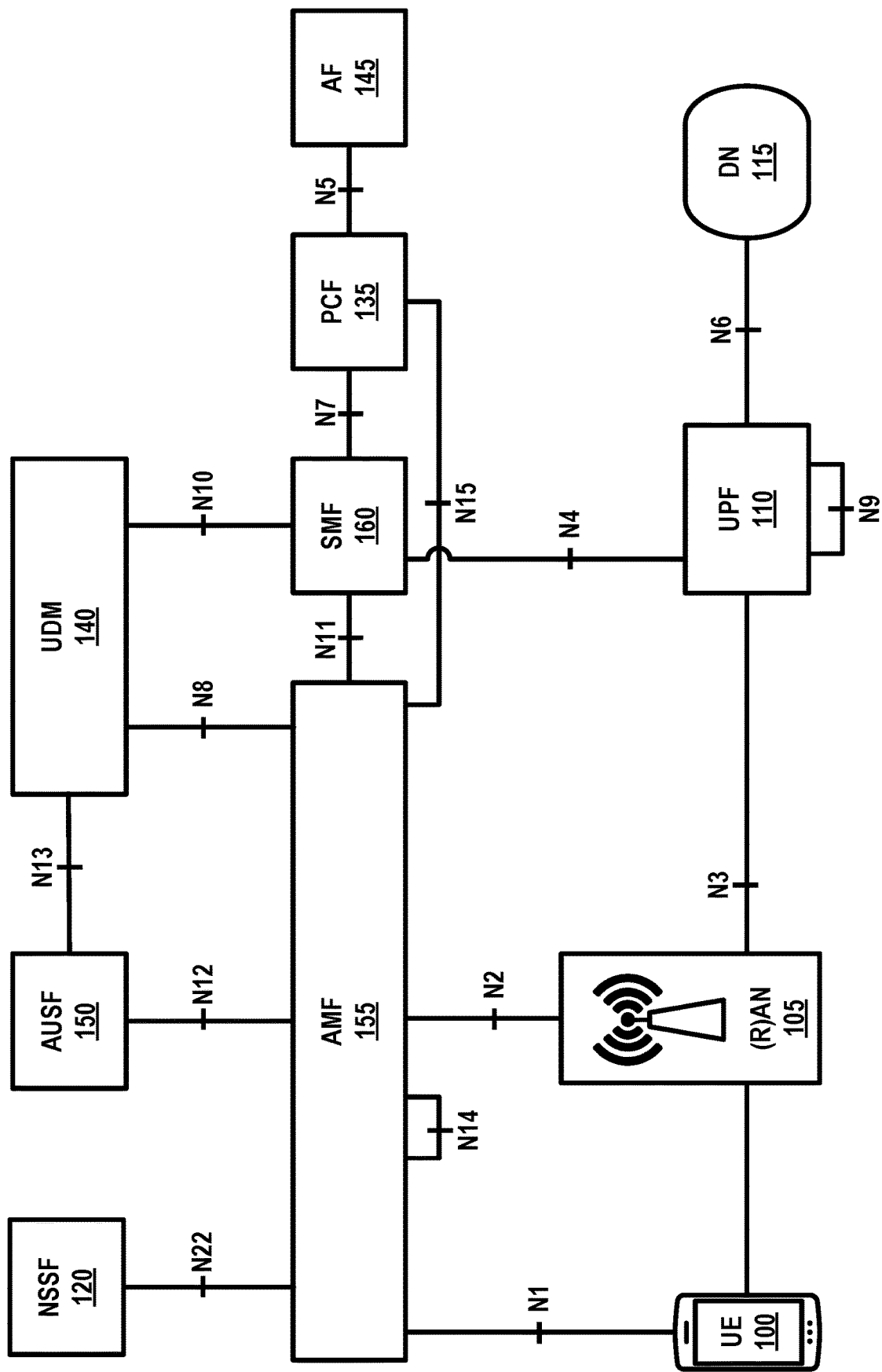
FIG. 1 is a diagram of an example 5G system architecture as per an aspect of an embodiment of the present disclosure.
Figure 2:
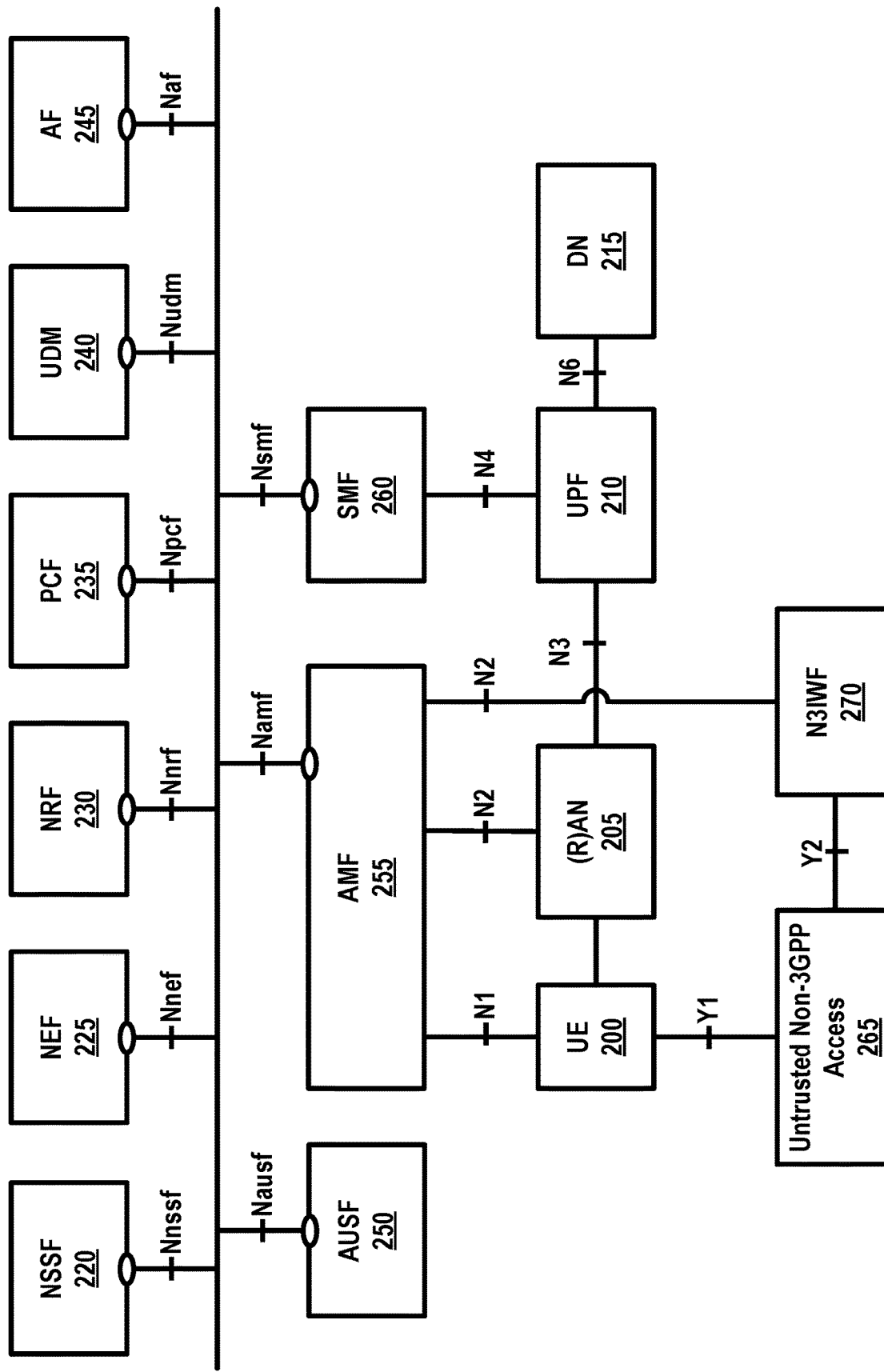
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NAS-MM Non-Access Stratum mobility management NAS-SM Non-Access Stratum session management
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access CHannel
PLMN Public Land Mobile Network
PSA PDU Session Anchor
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance information
SSC Session and Service Continuity
SUCI Served User Correlation ID
SUPI Subscriber Permanent Identifier
TEID Tunnel Endpoint Identifier
UDM Unified Data Management
UER Unified Data Repository
UDR User Data Repository
UE User Equipment
UL Uplink
UL CL Uplink Classifier
UPF User Plane Function
VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
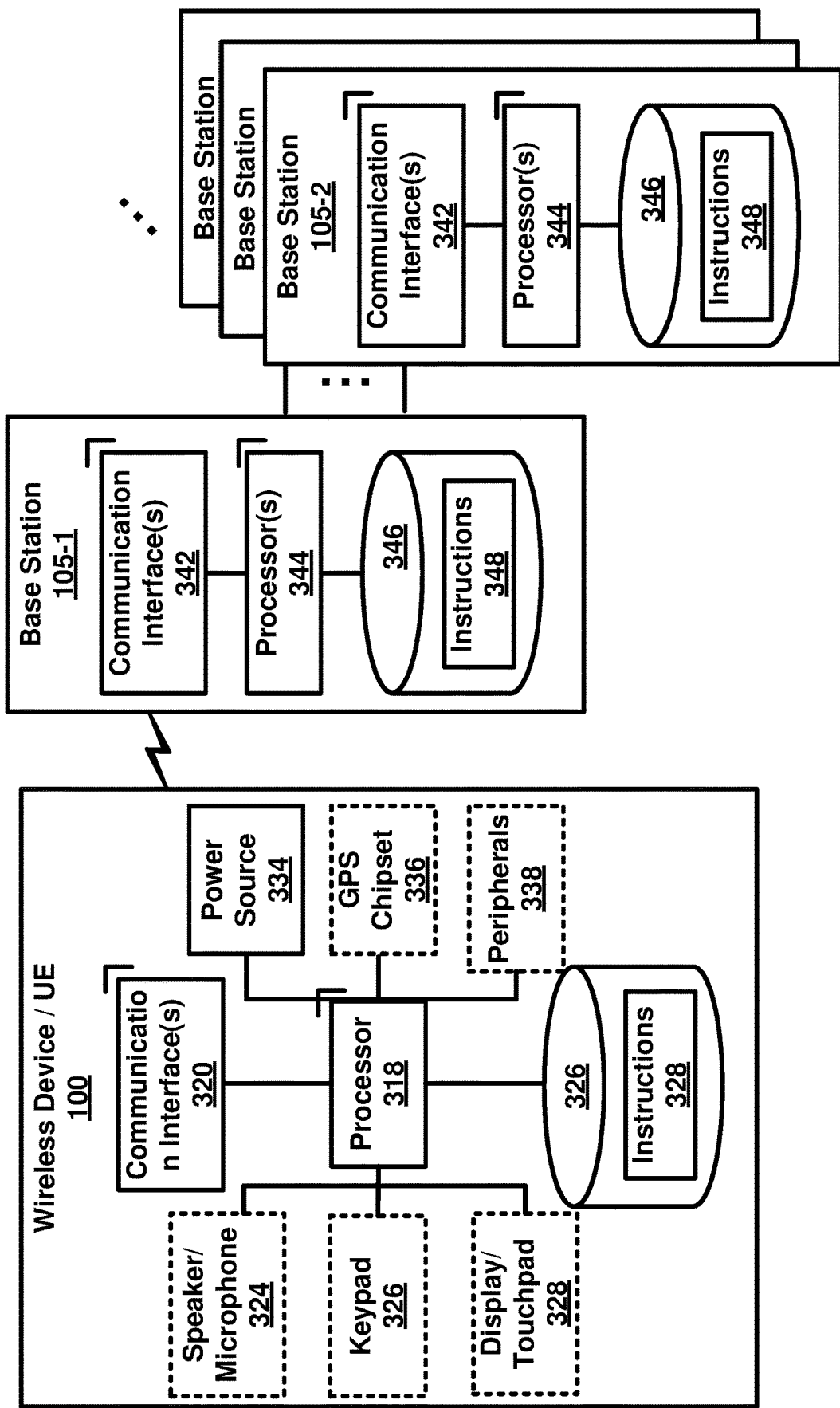
FIG. 3 is a system diagram of an example wireless device and a network node in a 5G system as per an aspect of an embodiment of the present disclosure.
Figure 4:
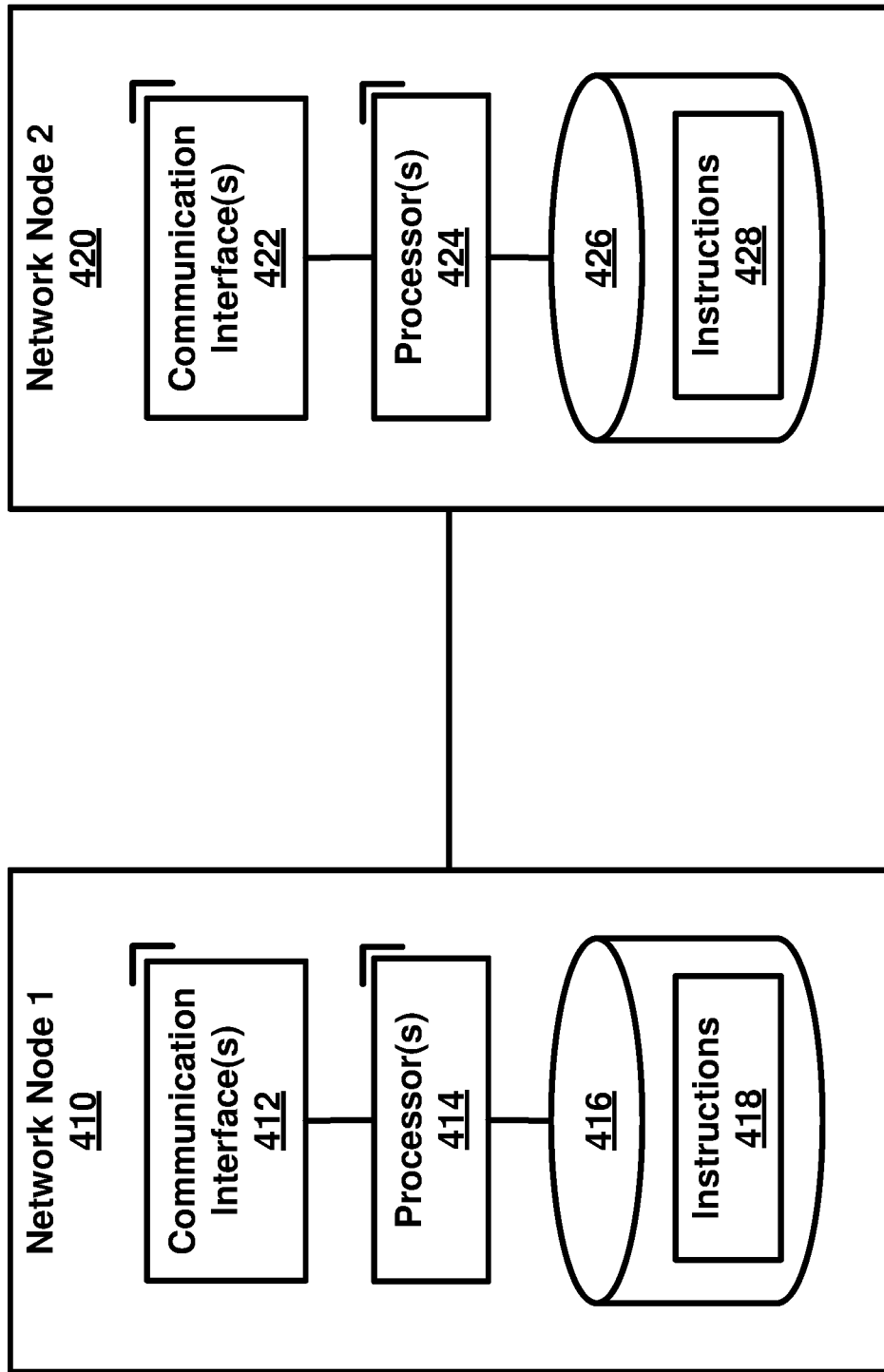
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
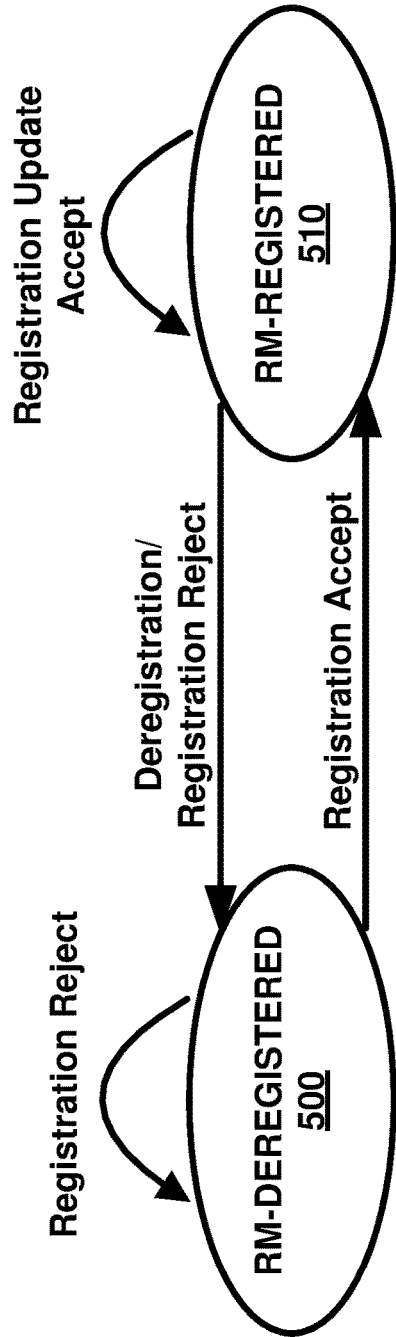
FIG. 5A and FIG. 5B depict two registration management state models in UE 100 and AMF 155 as per an aspect of embodiments of the present disclosure.
Figure 5B:
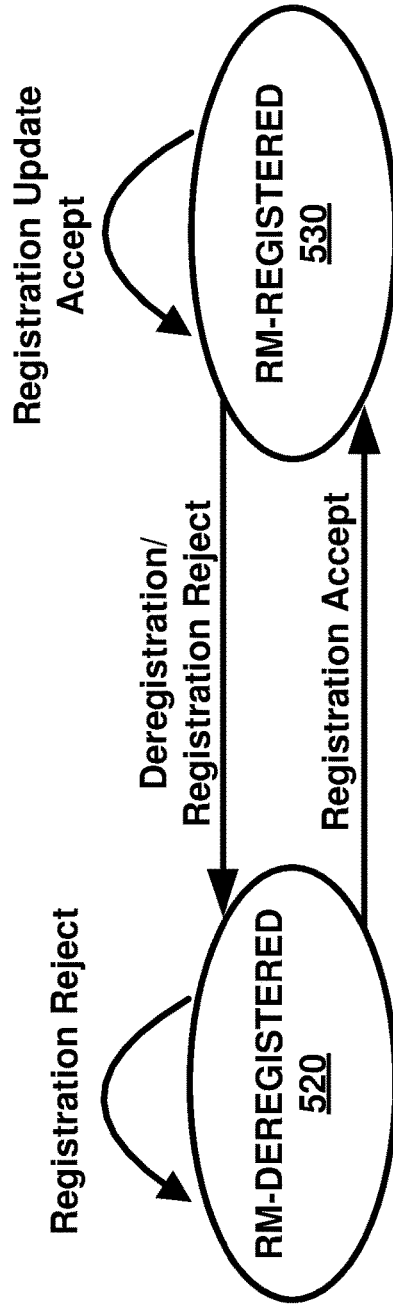

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
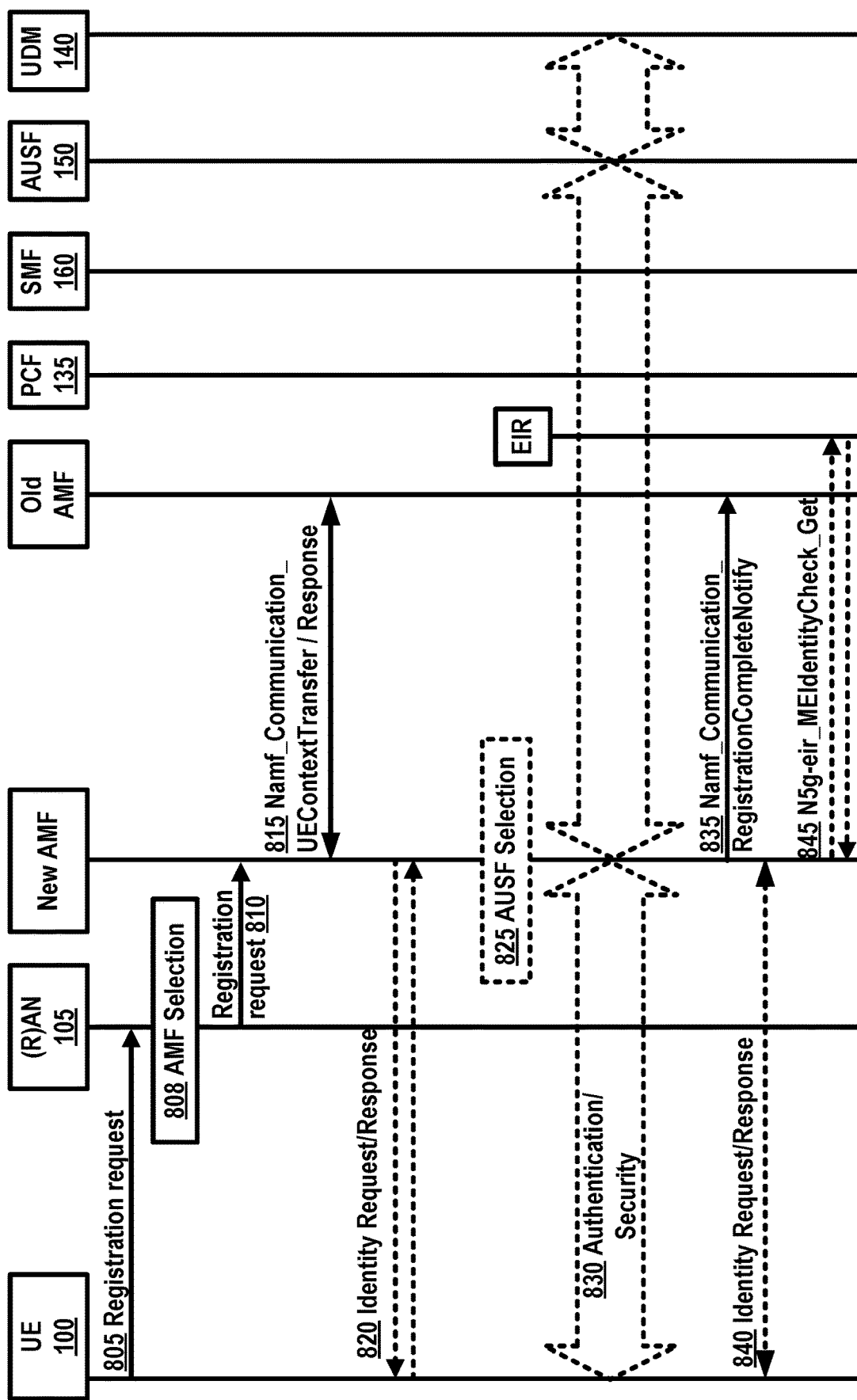
FIG. 8 is an example call flow as per an aspect of an embodiment of the present disclosure.
Figure 9:
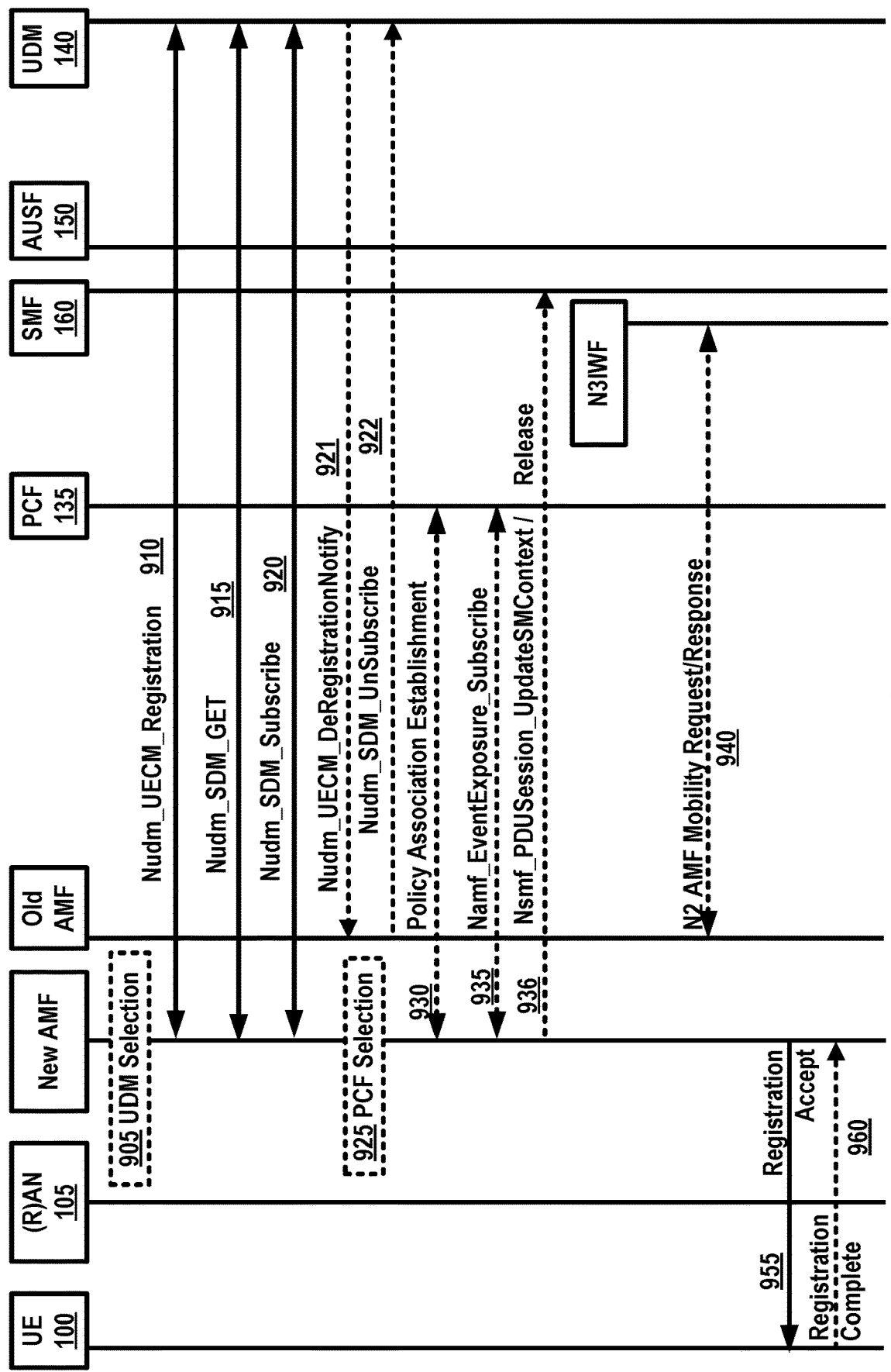
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155. In an example, the signaling connection may be a N1 signaling connection. In an example, the signaling connection may be a N1 NAS signaling connection.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 in CM-IDLE 600 state may be in RRC idle state. The UE 100 may perform cell selection, cell reselection, PLMN selection, and/or the like. A UE 100 in CM-CONNECTED 610 state may have a NAS signaling connection with the AMF 155 over N1. In an example, the UE 100 in CM-CONNECTED 610 state may be an RRC connected state. The UE 100 in CM-CONNECTED 610 state may be an RRC inactive state. In an example, a CM state in an AMF and a CM state in a UE may be different. This may be a case when a local state change happens without explicit signaling procedure (e.g., UE context release procedure) between the UE and the AMF. In an example, an RRC state in a UE (e.g., wireless device) and an RRC state in a base station (e.g., gNB, eNB) may be different. This may be a case when a local state change happens without explicit signaling procedure (e.g., RRC release procedure) between the UE and the base station.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
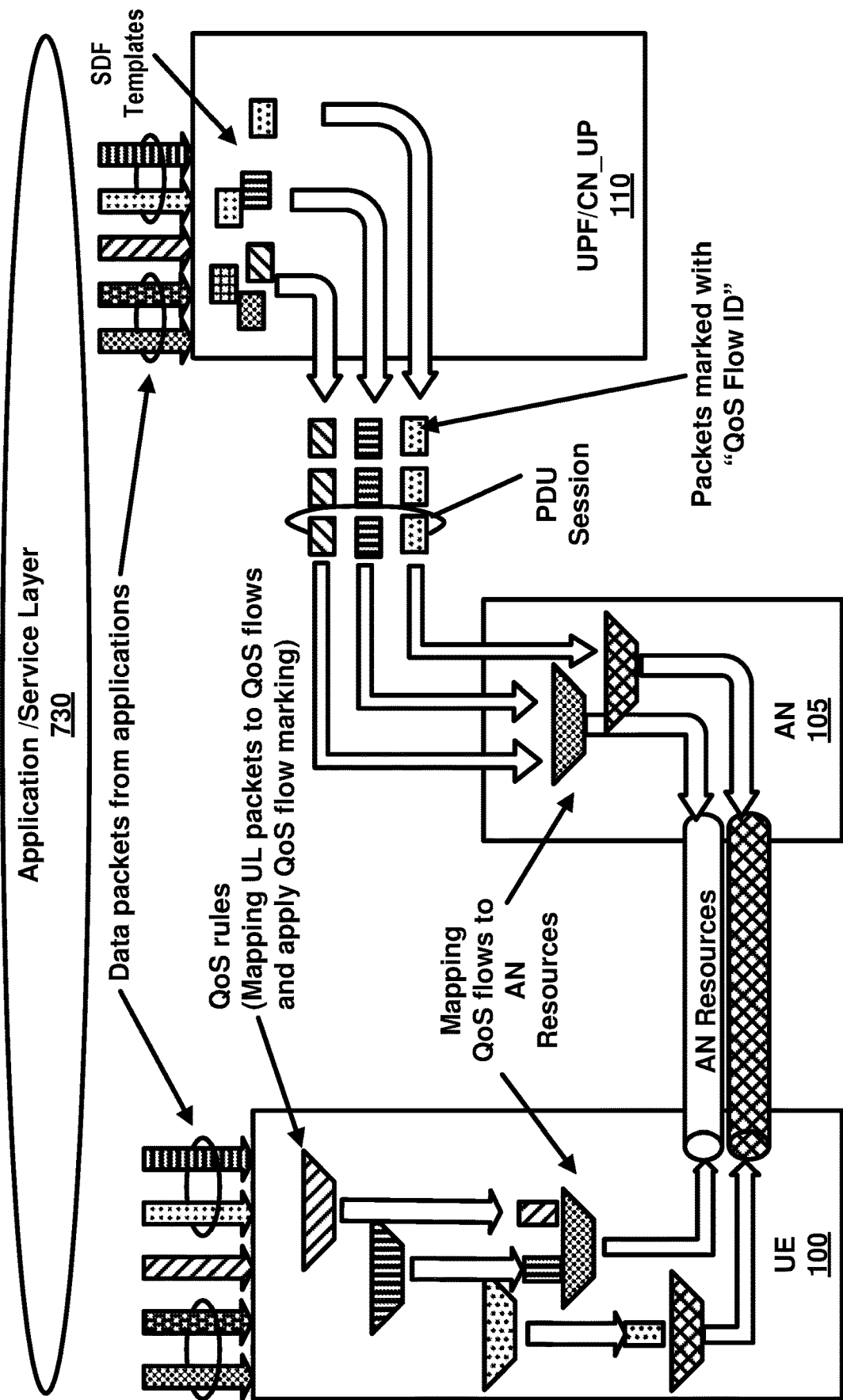
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, edge computing may provide compute and storage resources with adequate connectivity close to the devices generating traffic.

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g.

k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
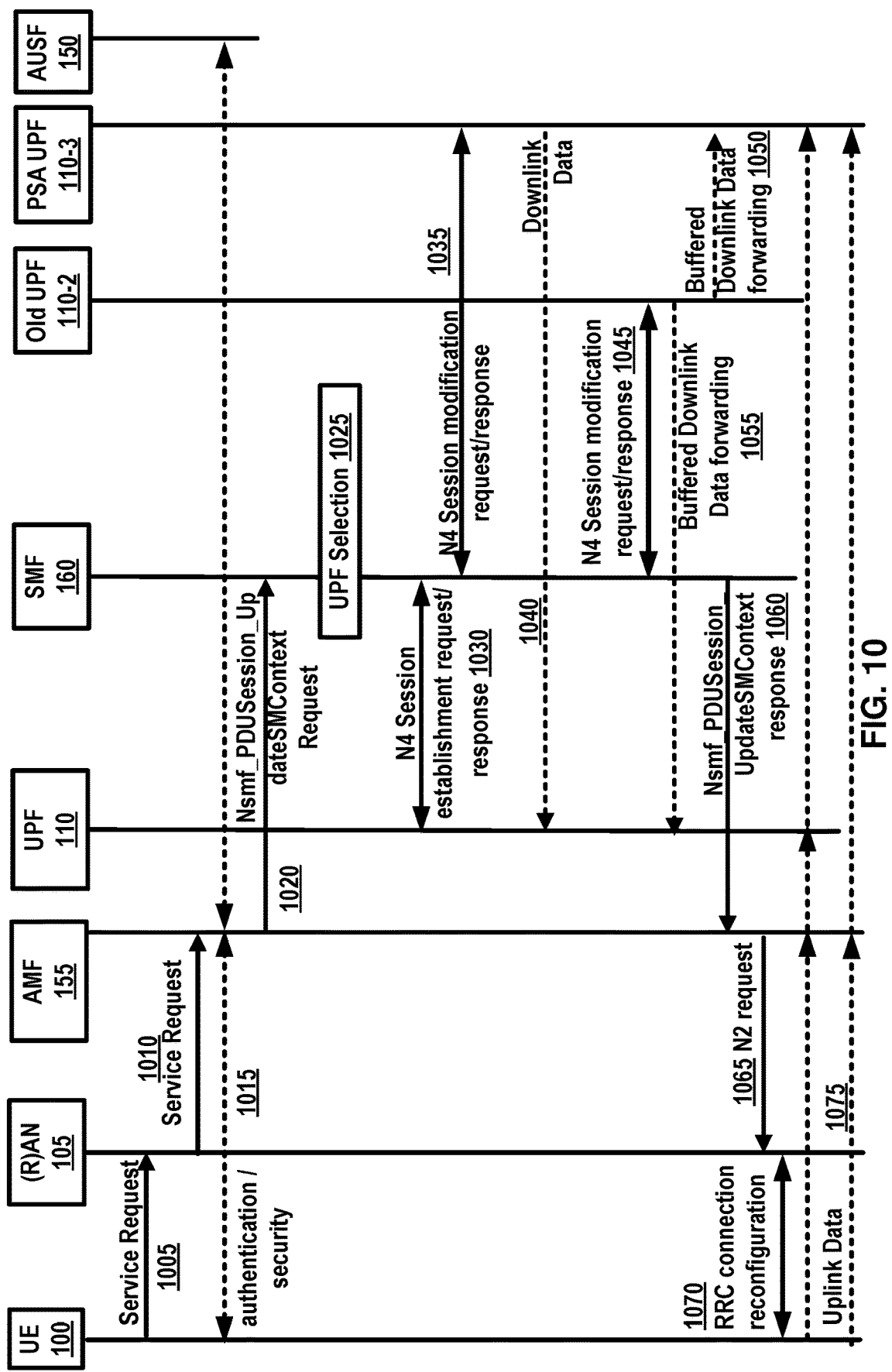
FIG. 10 is an example call flow as per an aspect of an embodiment of the present disclosure.
Figure 11:
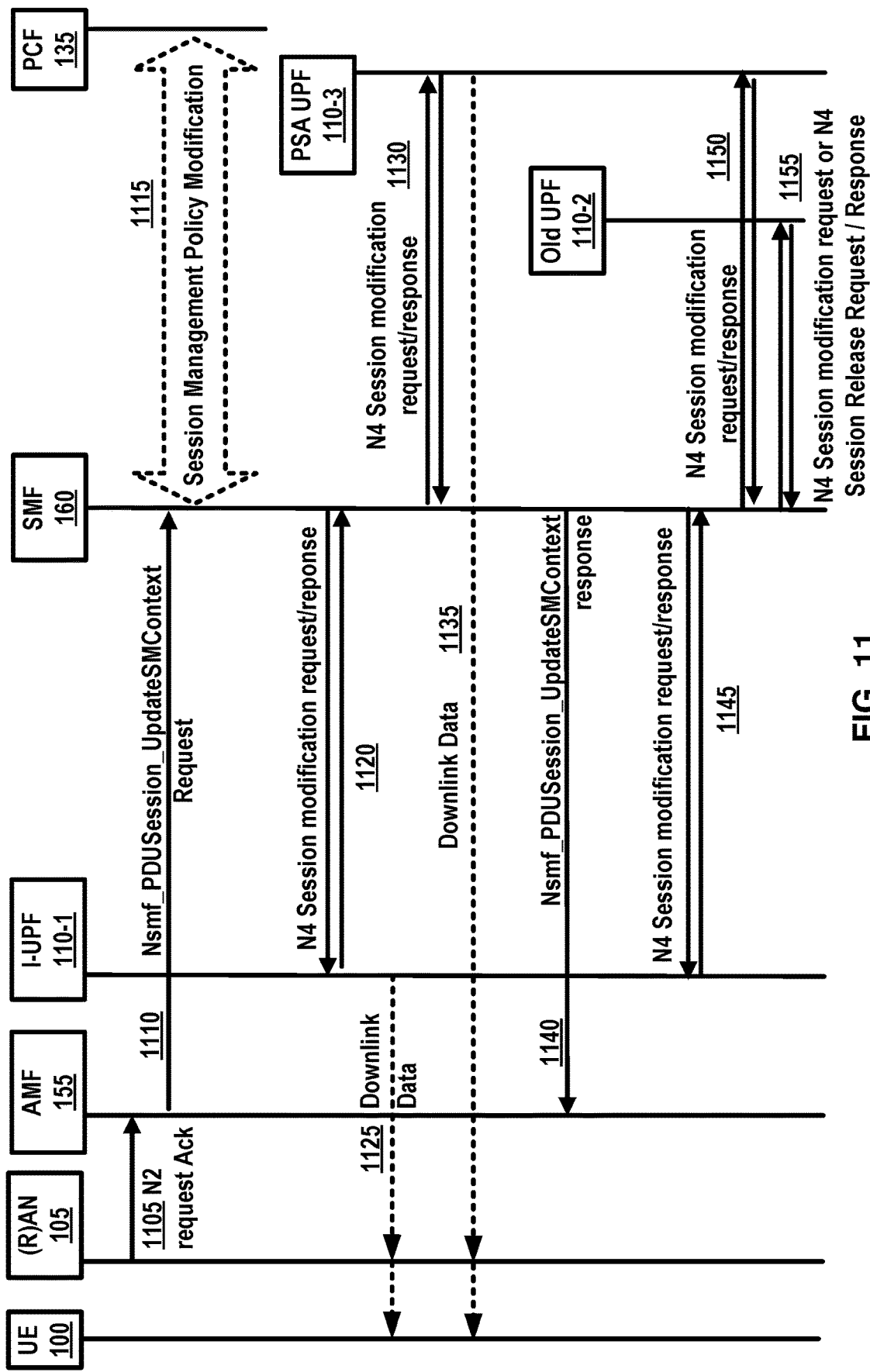
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
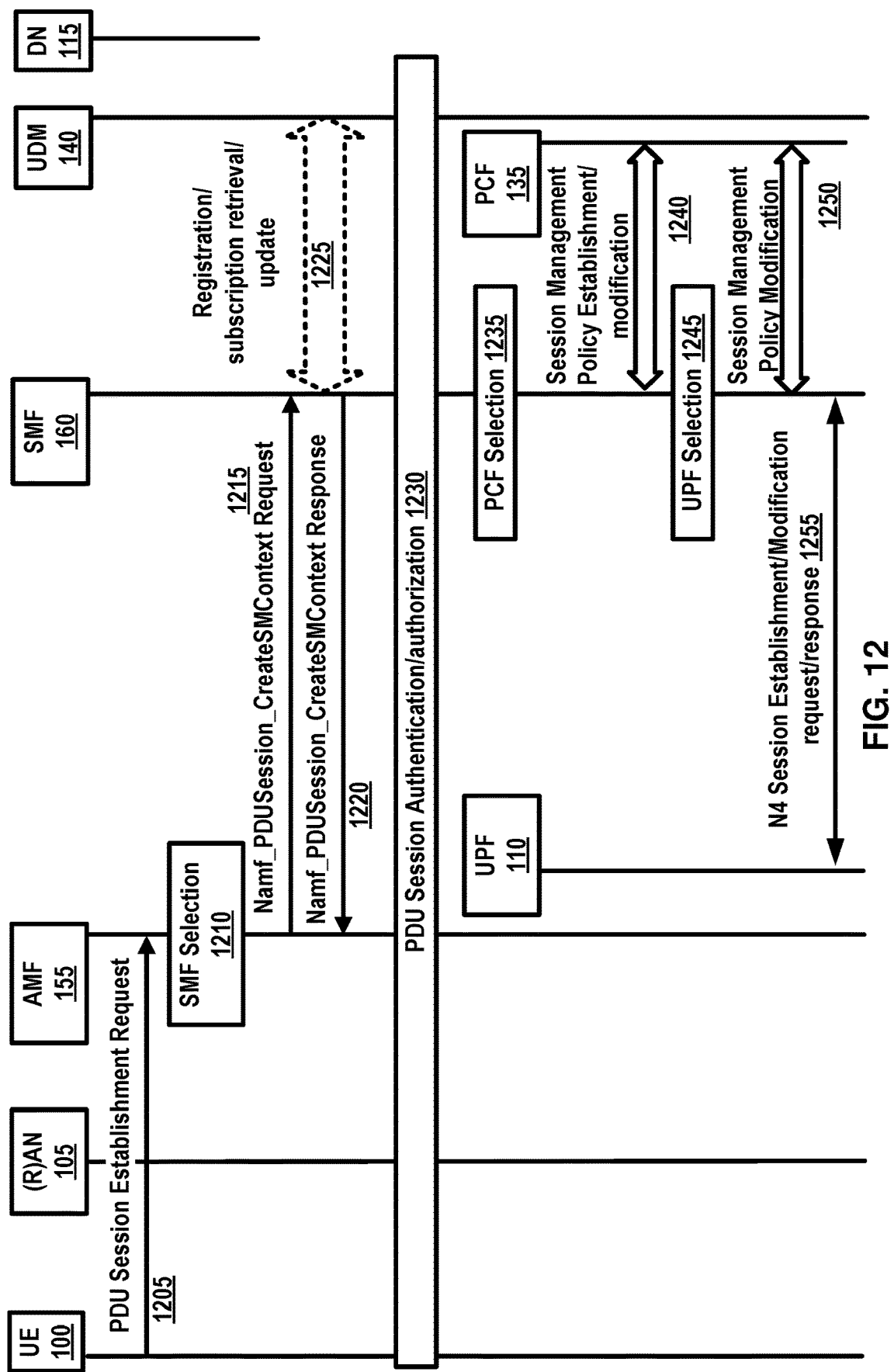
FIG. 12 is an example call flow as per an aspect of an embodiment of the present disclosure.
Figure 13:
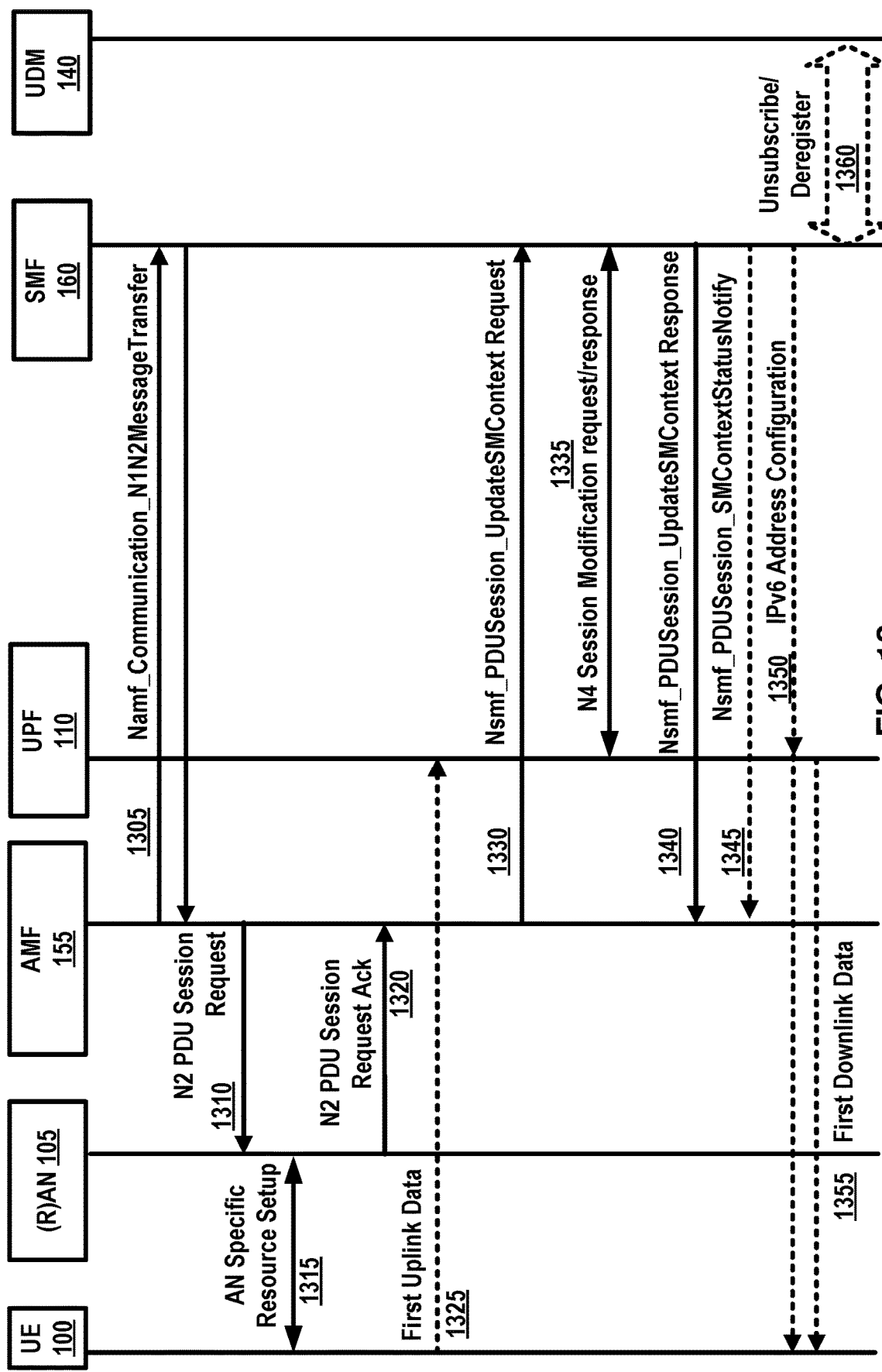
FIG. 13 is an example call flow as per an aspect of an embodiment of the present disclosure.
Figure 14:
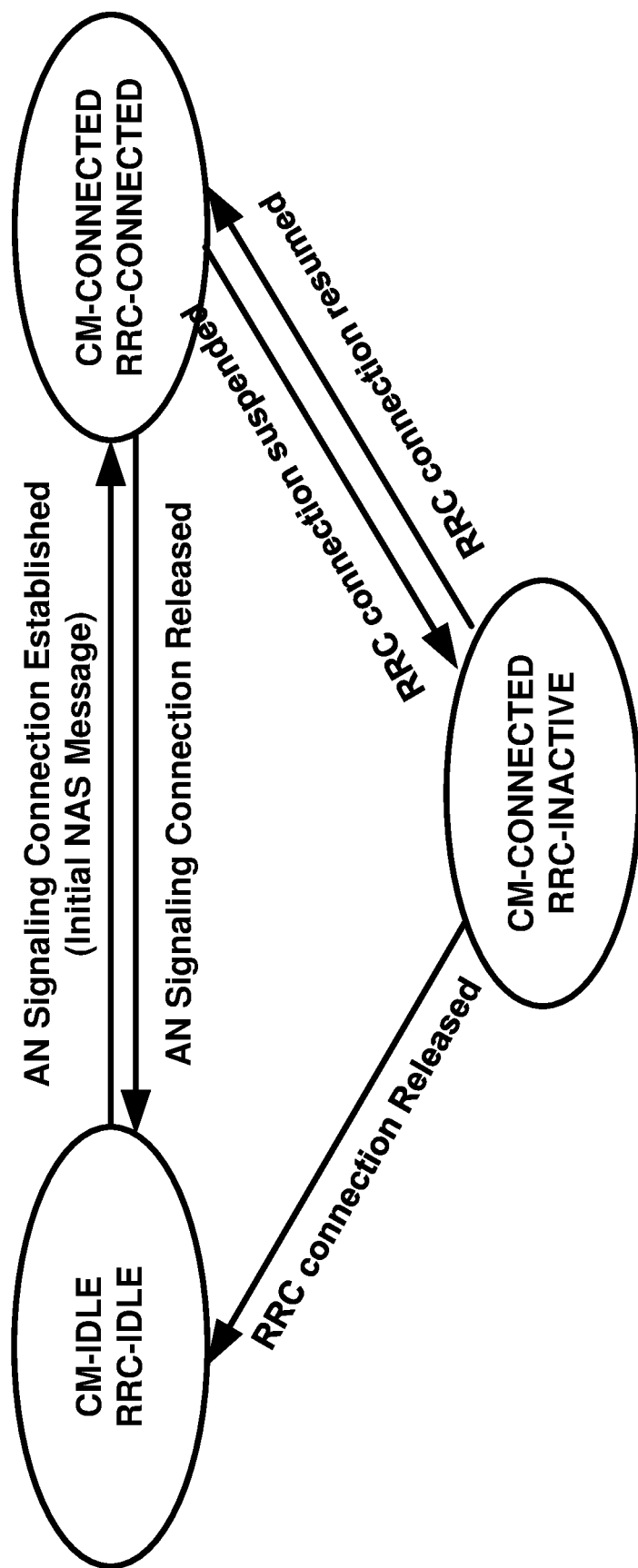
FIG. 14 is an example radio resource control (RRC) state transition aspect as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_ Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 15:
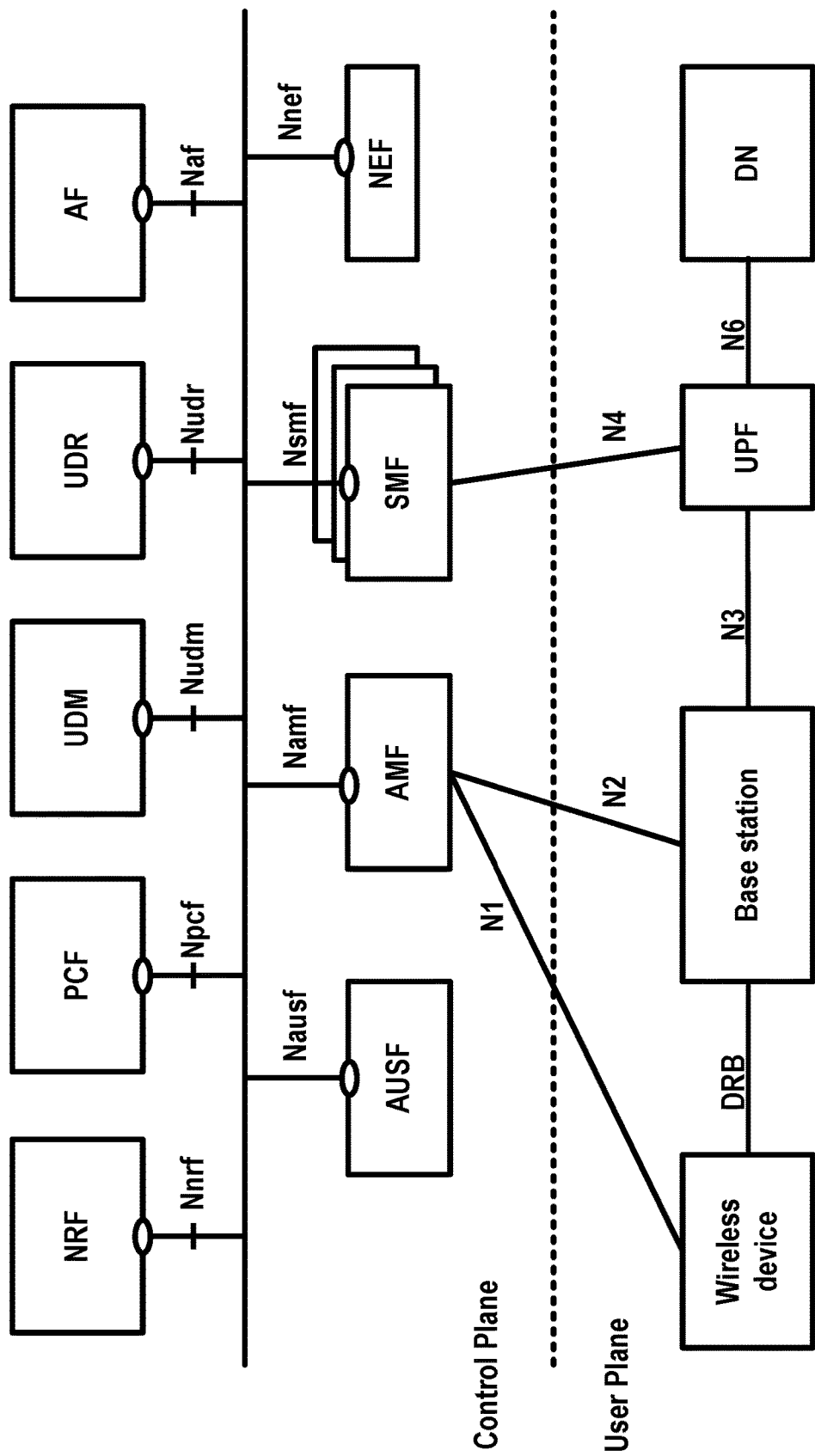
FIG. 15 illustrates a service-based architecture for a 5G network regarding interaction between a control plane (CP) and a user plane (UP).

FIG. 15 illustrates a service-based architecture for a 5G network regarding a control plane (CP) and a user plane (UP) interaction. This illustration may depict logical connections between nodes and functions, and its illustrated connections may not be interpreted as direct physical connections. A wireless device may form a radio access network connection with a bases station, which is connected to a User Plane (UP) Function (UPF) over a network interface providing a defined interface such as an N3 interface. The UPF may provide a logical connection to a data network (DN) over a network interface such as an N6 interface. The radio access network connection between the wireless device and the base station may be referred to as a data radio bearer (DRB).

The DN may be a data network used to provide an operator service, 3'rd party service such as the Internet, IP multimedia subsystem (IMS), augmented reality (AR), virtual reality (VR). In some embodiments DN may represent an edge computing network or resource, such as a mobile edge computing (MEC) network.

The wireless device also connects to the AMF through a logical N1 connection. The AMF may be responsible for authentication and authorization of access requests, as well as mobility management functions. The AMF may perform other roles and functions. In a service-based view, AMF may communicate with other core network control plane functions through a service-based interface denoted as Namf.

The SMF is a network function that may be responsible for the allocation and management of IP addresses that are assigned to a wireless device as well as the selection of a UPF for traffic associated with a particular session of the wireless device. There will be typically multiple SMFs in the network, each of which may be associated with a respective group of wireless devices, base stations or UPFs. The SMF may communicate with other core network functions, in a service based view, through a service based interface denoted as Nsmf. The SMF may also connect to a UPF through a logical interface such as network interface N4.

The authentication server function (AUSF) may provide authentication services to other network functions over a service based Nausf interface. A network exposure function (NEF) can be deployed in the network to allow servers, functions and other entities such as those outside a trusted domain (operator network) to have exposure to services and capabilities within the network. In one such example, the NEF may act like a proxy between an external application server (AS) outside the illustrated network and network functions such as the PCF, the SMF, the UDM and the AMF. The external AS may provide information that may be of use in the setup of the parameters associated with a data session. The NEF may communicate with other network functions through a service based Nnef network interface. The NEF may have an interface to non-3GPP functions.

The Network Repository Function (NRF) may provide network service discovery functionality. The NRF may be specific to the Public Land Mobility Network (PLMN) or network operator, with which it is associated. The service discovery functionality can allow network functions and wireless devices connected to the network to determine where and how to access existing network functions.

The PCF may communicate with other network functions over a service based Npcf interface, and may be used to provide policy and rules to other network functions, including those within the control plane. Enforcement and application of the policies and rules may not be responsibility of the PCF. The responsibility of the functions to which the PCF transmits the policy may be responsibility of the AMF or the SMF. In one such example, the PCF may transmit policy associated with session management to the SMF. This may be used to allow for a unified policy framework with which network behavior can be governed.

The UDM may present a service based Nudm interface to communicate with other network functions. The UDM may provide data storage facilities to other network functions. Unified data storage may allow for a consolidated view of network information that may be used to ensure that the most relevant information can be made available to different network functions from a single resource. This may allow implementation of other network functions easier, as they may not need to determine where a particular type of data is stored in the network. The UDM may employ an interface, such as Nudr to connect to the UDR. The PCF may be associated with the UDM.

The PCF may have a direct interface to the UDR or may use Nudr interface to connection with UDR. The UDM may receive requests to retrieve content stored in the UDR, or requests to store content in the UDR. The UDM may be responsible for functionality such as the processing of credentials, location management and subscription management. The UDR may also support authentication credential processing, user identification handling, access authorization, registration/mobility management, subscription management, and short message service (SMS) management. The UDR may be responsible for storing data provided by the UDM. The stored data is associated with policy profile information (which may be provided by PCF) that governs the access rights to the stored data. In some embodiments, the UDR may store policy data, as well as user subscription data which may include any or all of subscription identifiers, security credentials, access and mobility related subscription data and session related data.

The Application Function (AF) may represent the non-data plane (also referred to as the non-user plane) functionality of an application deployed within a network operator domain and within a 3GPP compliant network. The AF may in internal application server (AS). The AF may interact with other core network functions through a service based Naf interface, and may access network capability exposure information, as well as provide application information for use in decisions such as traffic routing. The AF can also interact with functions such as the PCF to provide application specific input into policy and policy enforcement decisions. In many situations, the AF may not provide network services to other network functions. The AF may be often viewed as a consumer or user of services provided by other network functions. An application (application server) outside of the trusted domain (operator network), may perform many of the same functions as AF through the use of NEF.

The wireless device may communicate with network functions that are in the core network control plane (CN-UP), and the core network user plane (CN-CP). The UPF and the data network (DN) is a part of the CN-UP. The DN may be out of core network domain (cellular network domain). In the illustration (FIG. 15), base station locates in CP-UP side. The base station may provide connectivity both for the CN-CP & CN-UP. AMF, SMF, AUSF, NEF, NRF, PCF, and UDM may be functions that reside within the CN-CP 328, and are often referred to as control plane functions. If the AF resides in the trusted domain, the AF may communicate with other functions within CN-CP directly via the service based Naf interface. If the AF resides outside of the trusted domain, the AM may communicate with other functions within CN-CP indirectly via the NEF.

FIGS. 16-20 relate to edge computing. Edge computing (also referred to as mobile edge computing, or MEC) is an evolution of cloud computing that brings hosting of applications from a centralized data center to a network edge. The network edge may be closer to end users and closer to the data generated by the end user's applications. Edge computing may be acknowledged as one of the key pillars for meeting the demanding key performance indicators of 5G, in particular, low latency and bandwidth efficiency. 5G networks may be a key future target environment for MEC deployments. Applications that use high data volumes and/or require short response times (e.g., virtual reality (VR) gaming, real-time facial recognition, video surveillance, etc.) may be particularly suitable for edge computing.

As will be discussed in greater detail below, 5G systems may support edge computing by allowing a MEC system and a 5G system to collaboratively interact for purposes of traffic routing and policy control. In an example, an application may operate as a MEC system having a MEC controller and a plurality of application servers. The MEC controller may be an application function (AF) that interacts with network functions of the 5G system (e.g., a network exposure function (NEF), a policy charging function (PCF), a session management function (SMF), etc.) to influence steering of traffic between the application and a wireless device. The wireless device may obtain MEC services associated with the application by connecting via the 5G system to the MEC system. The 5G system and the MEC system may collaborate to facilitate connection of the wireless device to one or more suitable application servers. One or more of the application servers may be a central application server that is, for example, located at a data center and accessible via the internet. One or more of the applications servers may be an edge application server located at, for example, an edge of the network. The edge application server may be nearer to the wireless device. The location of the edge application server (relative to the location of the central application server) may make the edge application server more suitable for certain tasks. For example, in some scenarios, the wireless device may be able to offload computational tasks to the edge application server, whereas the central application server is too remote for offloading.

Figure 16:
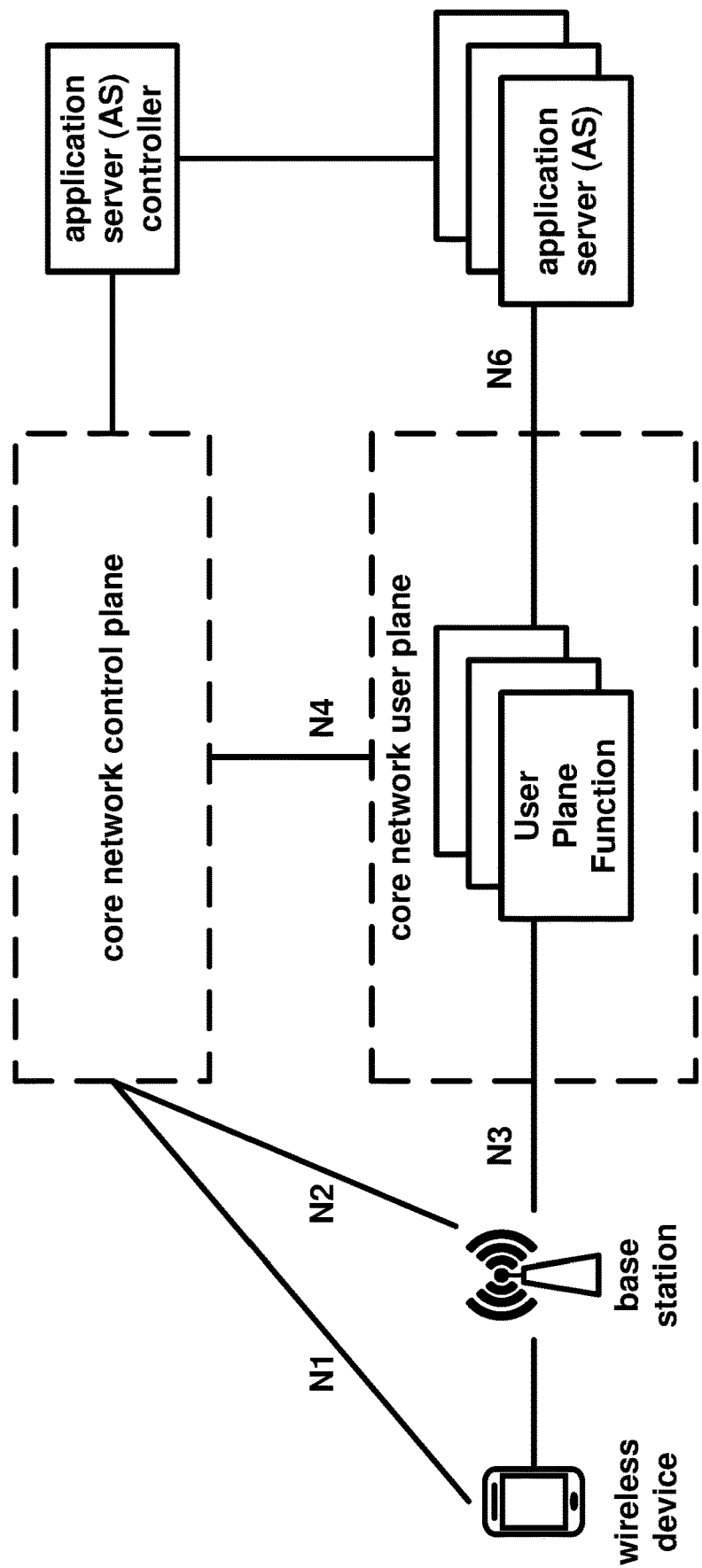
FIG. 16 illustrates an embodiment of a system that includes an application server controller.

FIG. 16 illustrates an embodiment of a system that includes an application server controller. A wireless device is connected to a core network via a base station. The wireless device may connect to the core network control plane (CN-CP) via interface N1 and/or interface N2. The wireless device may connect to the core network user plane (CN-UP) via interface N3.

The CN-UP may comprise one or more User Plane Functions (UPFs). One or more of the one or more UPFs may be used to connect the wireless device to an application server (AS) network. The AS network may comprise a plurality of application servers. The plurality of application servers may have different locations, for example, a geographical distribution. For example, there may be a central application server located within the AS network and/or one or more applications servers at different edges of the AS network. The network of ASs may be controlled by an AS controller. The AS controller may be implemented as an application function (AF) that is connected to the core network (for example, the CN CP). The AS controller may also be referred to as a MEC controller and/or an AF controller. The AS controller may be responsible for managing ASs and for locating, relocating, selecting, or reselecting an AS within the AS network. Part of the management performed by the AS controller may be to influence traffic steering within the core network.

Figure 17:
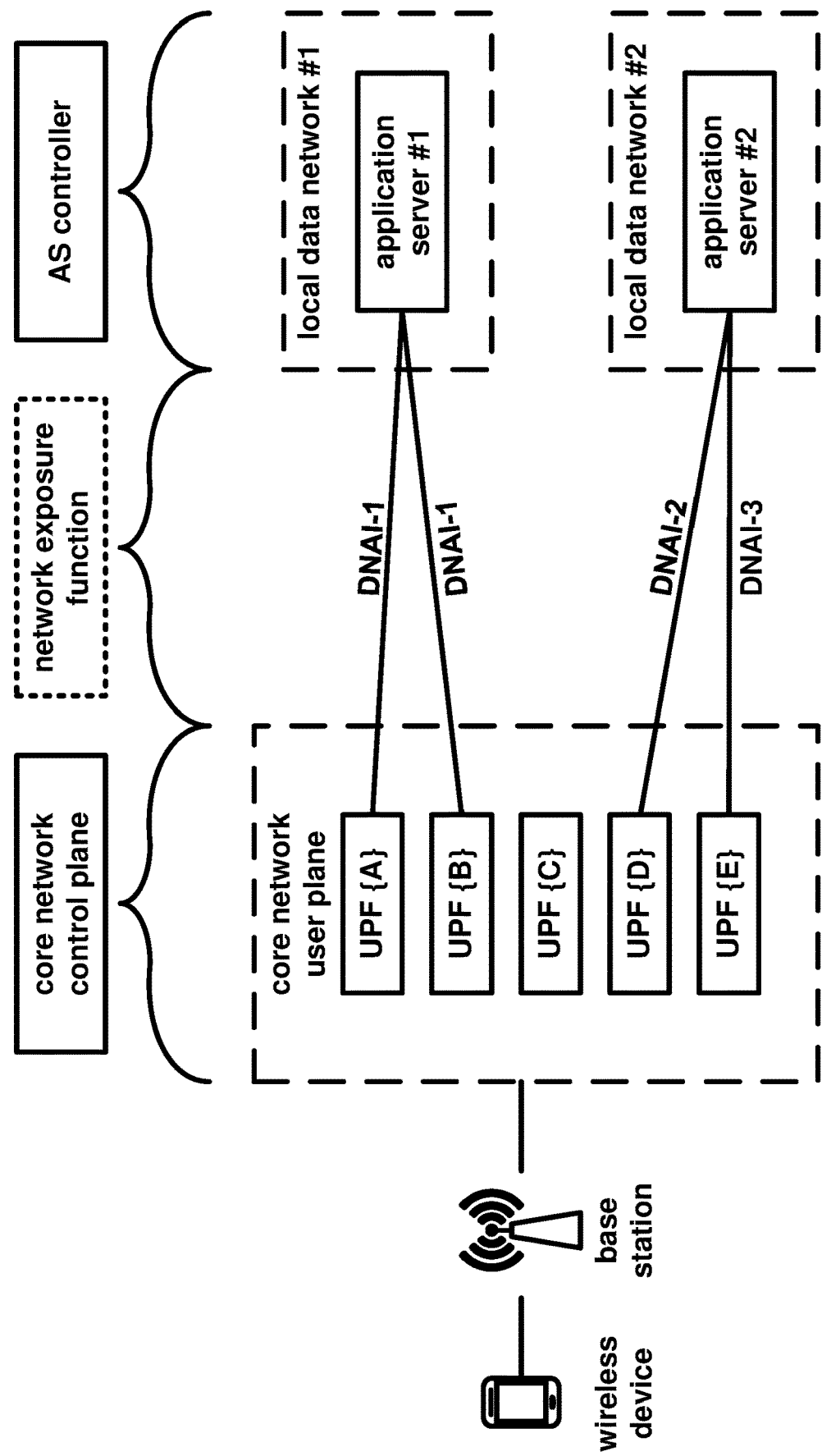
FIG. 17 illustrates segmented management between a cellular network domain and a mobile edge computing (MEC) domain.

FIG. 17 illustrates segmented management between a cellular network domain and a mobile edge computing (MEC) domain. A core network control plane (CN-CP) and a core network user plane (CN-UP) may belong to the cellular network domain. The CN-UP may comprise a plurality of UPFs, for example, UPF{A}, UPF{B}, UPF{C}, UPF{D}, and UPF{E}. The CN-CP may manage the CN-UP. The AS controller and one or more data networks (DNs) may belong to the MEC domain. The DNs may be referred to as data centers. As illustrated in the figure, the AS controller may manage multiple application servers, for example, an application server #1 and an application server #2. The application servers may be hosted on different DNs, for example, a local DN #1 and a local DN #2. Optionally, an NEF may manage the linkages between the cellular network domain and the MEC domain. Although it is illustrated separately, the NEF may belong to the CN-CP.

In an example, a location of an application server may be indicated by a DN access identifier (DNAI). The DNAI may be interpreted as an index that points to one specific access into one or more DNs. The DNAI values may be defined by an operator based on deployment and/or configuration characteristics of the core network. The DNAIs (for example, DNAI-1, DNAI-2, DNAI-3) may be used by the AS controller to interact with the CN-CP. In the figure, DNAI-1 may indicate one or more areas of the CN-UP which correspond to application server #1. An area of the CN-UP which corresponds to application server #1 may include the UPF{A} and the UPF{B}. In the figure, DNAI-2 may indicate one or more areas of the CN-UP which correspond to application server #2. An area of the CN-UP which corresponds to application server #2 may include the UPF{D}. DNAI 3 may also indicate an area of the CN-UP which corresponds to application server #2, and which includes the UPF{E}. The UPF{C} may not correspond to a particular application server.

In an example, an operator may internally define an area associated with a particular DNAI. The operator may define the areas arbitrarily. As an example, all UPFs that are linked to a particular application server may share a DNAI (similar to DNAI-1 in the figure). As an example, DNAI correspond to a group of UPFs, and multiple DNAI may correspond to a particular application server (similar to DNAI-2 and DNAI-3 in the figure).

In an example, if a wireless device is in a first area, the CN-CP may determine to route application-related traffic of the wireless device to the local DN #1 via the UPF{B}. This may be based on a determination that routing via the UPF{B} is more efficient than other possible routes. If the wireless device moves to a second area, the AS controller and/or core network may determine to re-route the application-related traffic of the wireless device to the local DN #1 via the UPF{D}. The DNAIs may enable the cellular network domain and/or the MEC domain to map a particular application server to a particular area, or vice-versa. As an example, the DNAIs may enable the cellular network domain to manage traffic between a wireless device and one or more application servers. As an example, the DNAIs may be known to the AS controller and may be used to facilitate AS management by the AS controller. Using the DNAIs, the AS controller may be enabled to communicate with the CN-CP in order to influence, for example, routing of application-related traffic.

Figure 18A:
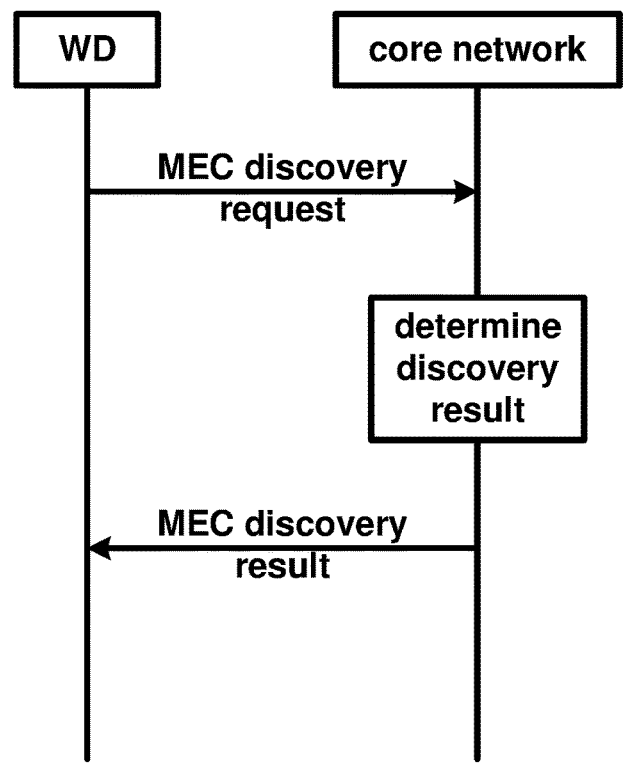
FIG. 18A is an example call flow for MEC discovery.

FIG. 18A is an example call flow for MEC discovery. A wireless device may discover MEC applications by sending a MEC discovery request to a CN-CP function. As an example, the request may include a data network name (DNN) of a local DN requesting discovery of MEC applications hosted inside the specified local DN. In some implementations, the absence of a local DN name may indicate that a discovery of all MEC applications is requested. As an example, the request may include an application identifier. The CN-CP function may determine a discovery result. The discovery may be based on registration data of MEC applications hosted by various data networks. The CN-CP function may cross-reference a particular MEC application to a particular data network, or vice-versa. The CN-CP may respond to the wireless device with the discovery result. The discovery result may include a list of one or more application identifiers and/or one or more application addresses (for example, corresponding to a particular DN). In some embodiments, the discovery results may be limited to those MEC applications available to the wireless device. In some embodiments, the discovery results may be limited to those MEC application that the wireless device is authorized to use. The one or more application addresses may be used by the wireless device for upper layer (such as TCP layer) communication with the MEC application.

In an example, a discovery request procedure of the MEC applications may be integrated with a registration procedure between the wireless device and a CN-CP function (e.g., an AMF). In an example, the discovery request procedure of the MEC applications may be integrated with a session establishment procedure between the wireless device and a CN-CP function (e.g., an SMF). The CN-CP function may notify the wireless device about changes in the discovery result, such as an application address change, through an NAS message. The wireless device may request a dedicated PDU session to handle traffic associated with a MEC application. Such a dedicated PDU session may be used for a single edge computing application or shared by multiple edge computing applications.

Figure 18B:
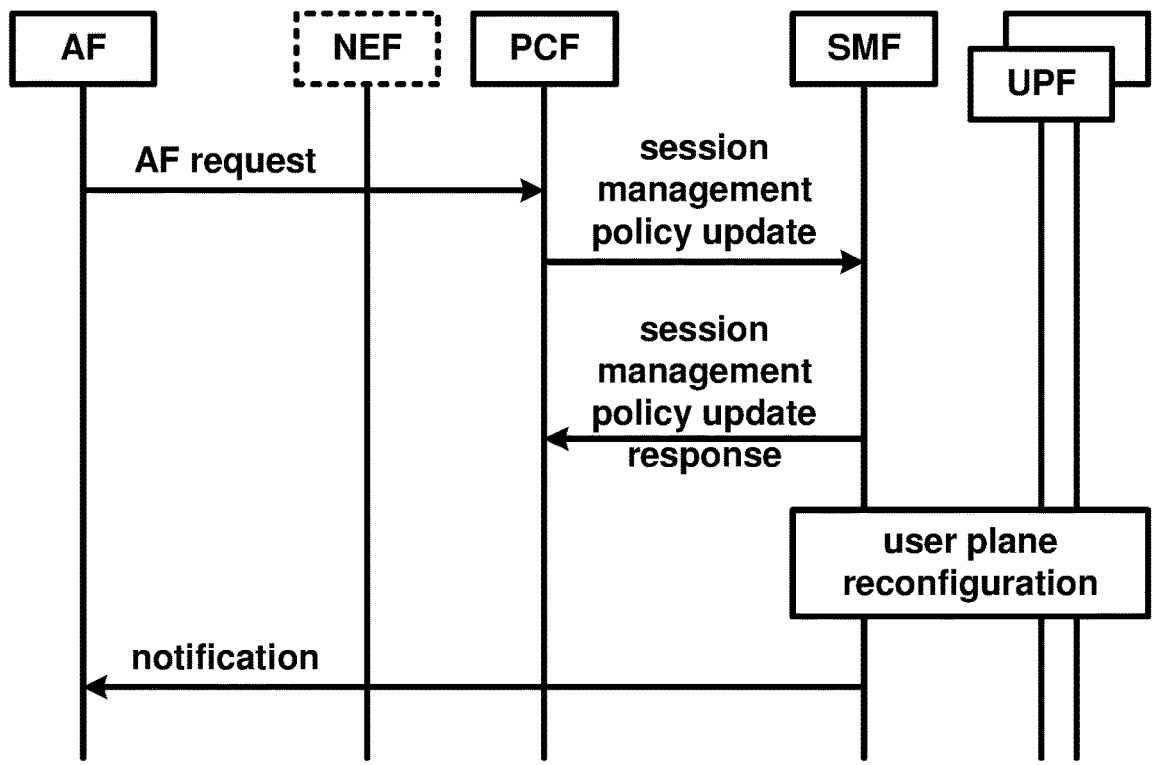
FIG. 18B illustrates an example of how an AS controller can exert influence on traffic routing of application data within a core network.

FIG. 18B illustrates an example of how an AS controller can exert influence on traffic routing of application data within a core network. The AS controller may send an AF request to a PCF. In an example, the AF may send an AF request message to the PCF via an NEF. If the AF request message is sent via the NEF, the NEF may map external identifiers provided by the AF to internal identifiers known by the 5G system (for example, a UE ID, SUPI, etc.). In an example, the AF may send an AF request message to the PCF directly. The AF request may be sent directly to the PCF if, for example, the AF is in a trusted domain and/or deployed by an operator of the core network.

The AF request may comprise any information suitable for influencing traffic routing. Depending on the implementation and/or the capabilities of the AS controller, the AF request may contain a range of information. For example, the AF request may comprise a general request that the core network attempt to optimize the user plane configuration, specific information that the core network may use to facilitate user plane configuration, and/or specific instructions for configuration of the user plane. The AF request may comprise a traffic descriptor (an IP filter and/or an application identifier) describing the application traffic covered by the AF request message. The AF request may comprise a location of one or more applications and/or application servers, for example, a list of DNAIs. The AF request may comprise an identifier of a target wireless device, for example, a generic public subscription identifier (GPSI), user equipment (UE) group identifier. The AF request may comprise N6 routing information indicating how traffic should be forwarded via an N6 interface, for example, a target IP address (and/or port) in the DN to which the application traffic is requested to be tunneled. The AF request may comprise spatial and temporal validity conditions indicating one or more time intervals and/or geographic areas for when and/or where the AF request message is to be applied.

Based on the AF request message, the PCF may create policy and charging control (PCC) rules and/or other relevant information, for example, a requested Session and Service Continuity (SSC) mode, local UPF information, or any other relevant information. The PCF may send a session management policy update message to the SMF. The session management policy update message may indicate the PCC rules and/or the relevant information. The SMF then may act on the relevant information. In an example, by configuring or reconfiguring the user plane. In an example, the SMF may insert an uplink classifier (UL CL) UPF into the user plane based on the information. In an example, the SMF may trigger relocation of a PDU session anchor (PSA) UPF using SSC mode 2 or 3 procedures. As illustrated in the figure, the SMF may send a session management policy update response to the PCF. The response may be sent before or after a user plane reconfiguration. In an example, the response may include an acknowledgement that the session management policy update message has been received. In an example, the response may notify the PCF as to whether and/or how the user plane has been reconfigured.

The AF request may instruct the SMF to notify the AF when a UPF related event occurs. For example, the SMF may notify the AF when a UL CL UPF is inserted into the user plane, when an SSC mode 2 or mode 3 procedure is triggered, and/or when a PSA UPF is relocated. The AF can request to be notified before the event is to take place and/or after the event has taken place. Based on the notification, the AF may take application layer actions such as relocating application state of handle UE IP address changes.

Figure 19:
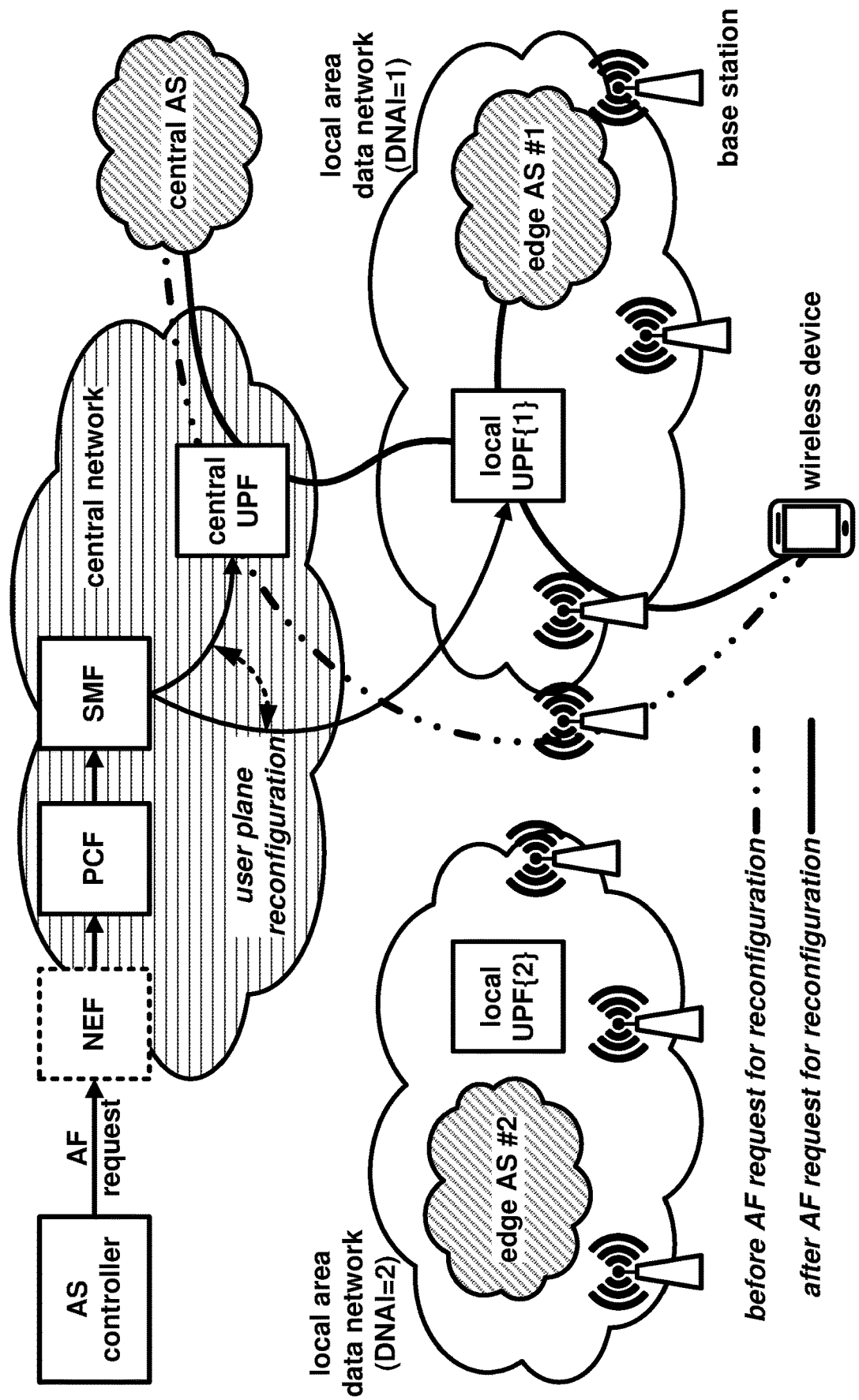
FIG. 19 illustrates an example of an AS controller influencing traffic routing of application data by causing a user plane reconfiguration within a core network.

FIG. 19 illustrates an example of an AS controller influencing traffic routing of application data by causing a user plane reconfiguration within a core network. As noted above, the AS controller may be implemented as an AF. The application, or aspects thereof, is accessible in three different data networks. The data networks may comprise a central network, a first local area data network, and a second local area data network. The central network has a DNAI=0 and comprises a central application server. In an example, the central application server may be accessible via the internet. The first local area data network has a DNAI=1 and comprises a first edge application server. The second local area data network has a DNAI=2 and comprises a second edge application server. The first local area data network is associated with one or more UPFs including UPF{1}. The second local area data network is associated with one or more UPFs including UPF{2}.

Initially (before the AF request), the user plane path between the wireless device and the application is via a central UPF associated with the central network (dashed and dotted line in the figure). The location of the central UPF may be remote from the location of the wireless device. Based on the AF request, the SMF may insert a local UPF within the user plane path of the wireless device. In an example, the AF request message may indicate the DNAI of a requested area (DNAI=1). Based on the DNAI indicated by the AF request message, the SMG may select a UPF associated with the first local area data network (i.e., UPF{1}).

After the AF request, the SMF may reconfigure the user plane path. In particular, the wireless device may have a user plane path to an edge application server within the first local area data network and to the central application server (solid line in the figure). Because the first edge application server is nearer to the wireless device than the central application server, it will be understood that communication delay associated with the first edge application server may be less than the communication delay associated with the central application server. Accordingly, in some scenarios, the new user plane path (i.e., the path that is requested by the AS controller) may reduce the delays associated with offloading of certain application-related tasks.

Figure 20:
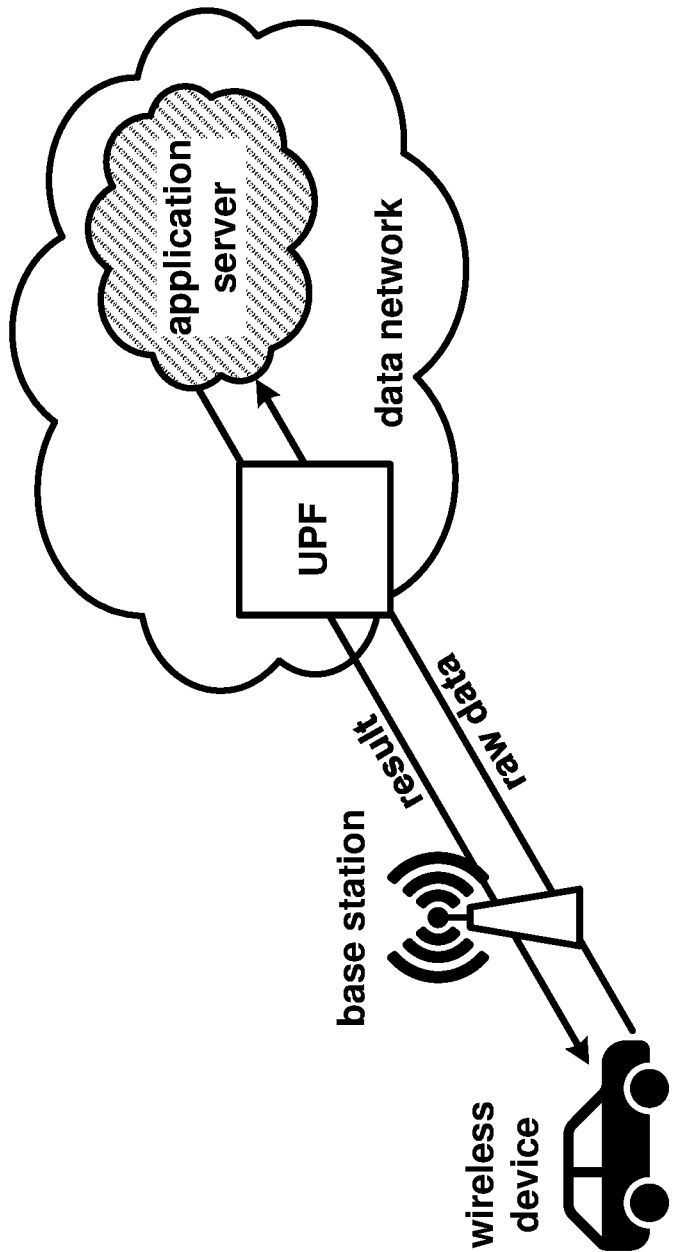
FIG. 20 illustrates examples of offloading.

FIG. 20 illustrates examples of offloading. An application may operate on a wireless device, and may require the wireless device to perform tasks. The wireless device may determine to offload tasks to an application server associated with the application. The application server may be an edge application server. The application server may be located in a data network. The data network may be a local area data network. The data network may be a cloud computing data center. The wireless device may send raw data and/or processing tasks to the application server.

The application operating on the wireless device may obtain raw data at the wireless device. The raw data may be referred to as unprocessed data. The raw data may be gathered and/or generated by the wireless device. In this example figure, the wireless device is illustrated as a vehicle. The vehicle is running, for example, a vehicle-to-everything (V2X) automatic driving application. The application may cause the wireless device to take photos of the front, right, left, and rear of the vehicle. The photos may be the raw data. The application operating on the wireless device may process the raw data to obtain a result. The result may be referred to as processed data. In this example, the result may be a driving direction. Alternatively, the wireless device may determine to offload tasks to an application server associated with the application. To offload, the wireless device may transmit the raw data to the application server. The application server may process the raw data (for example, the photos) to obtain the result (for example, the driving direction). The application may transmit the result to the wireless device. The wireless device may obtain the result by receiving the result from the application server.

In the offloading example illustrated in the figure, raw data is transmitted and a complete result is obtained. However, it will be understood that the processing of the raw data to obtain the result may comprise a plurality of processing tasks, and that offloading may be defined as having occurred when any number of these tasks are performed by the application server. In an example, the wireless device may perform one or more first processing tasks on the raw data and transmit an incomplete result to the application server. The application server may perform one or more second processing tasks on the partial (incomplete) result to obtain a complete result and transmit the complete result to the wireless device. Alternatively, the wireless device may transmit raw data and the application server may perform the one or more first processing tasks, before transmitting the partial (incomplete) result to the wireless device. The wireless device may perform the one or more second processing tasks on the incomplete result to obtain a complete result. In the present disclosure, the term unprocessed data may refer to data that is not fully processed to obtain the result, including raw data or partially-processed data.

In existing technologies, communication networks (e.g., 5G 3GPP systems) may support edge computing by allowing a MEC system and a 5G system to collaboratively interact to route traffic. The MEC system may instruct a change of a user plane path from a central application server to a local application server. The MEC system may redirect a user plane path from a central user plane function (UPF) to a local UPF. In some scenarios, the latency of the user plane path may be reduced by redirecting the user plane path to an application server which is closer to a location of the wireless device. By offloading processing tasks, the wireless device can potentially reduce its computational burden and/or conserve resources. The wireless device may offload processing tasks to the application server using an application layer that is transparent to the 5G system. The 5G system may not support collaborative interaction with the MEC system to offload the processing tasks. The existing technology may not be efficient to employ the offloading handling by a wireless device and an application. In an example, battery resources and/or computational resources of a wireless device may be limited. To conserve resources, the wireless device may prefer to connect to an application server that provides offload capability. For the wireless devices to get service within the MEC environment, an improved method for session management handling to control the offloading is needed to increase resource utilization efficiency, battery utilization and to guarantee quality of service of the wireless devices.

In existing technologies, a wireless device may benefit from offloaded processing of application data. The offloaded processing may be performed with edge computing. The edge computing may be performed by an application server associated with the application. Implementation of edge computing may require management of one or more user plane paths within a communication network (for example, a user plane path between the wireless device and the edge computing application server and/or between the wireless device and the central application server). The benefits of edge computing may be reduced if a user plane path can not be arranged and/or configured quickly and efficiently. In existing technologies, an application server associated with the application (e.g., an edge computing application server proximate to the wireless device and/or a central application server) may lack effective signaling processes for arranging and/or configuring the user plane path. For example, the application server(s) may lack information about whether offloaded processing is suitable for and/or requested by the wireless device. For example, the user plane path may be within a communication network, and the application server(s) may attempt to manage the user plane path from outside the network. For example, the wireless device may attempt to inform the application server(s) of a request for offloaded processing via an inefficient user plane path of a network, and the application server(s) may attempt to arrange for a more suitable user plane path from outside of the network. Accordingly, offloaded processing may be delayed and/or rejected, and/or an inefficient user plane path may be established. In such a case, the computational load on the wireless device may increase, and user experience may be negatively affected.

In an example, a wireless device may send a session control message to the SMF, for a PDU session, requesting offloaded processing for an application. Offloading may refer to offloading of one or more processing tasks, and may be referred to as computation offloading, task offloading, and/or processing offloading. The wireless device may receive, from the SMF, a session control response message for the PDU session indicating whether the offloading is available or not. The wireless device may determine to send data that is unprocessed by the application based on the indication that the offloading is available. The data that is unprocessed may be raw data or data that is partially processed to obtain a partial/incomplete result. The wireless device may determine to send data that is processed by the application based on the indication that the offloading is not available.

In an example, a wireless device may determine to send a request for offloaded processing of application data to an SMF. The request may be included in a first message that comprises single network slice selection assistance information (S-NSSAI). The S-NSSAI may identify a slice of a PDU session associated with the application. The first message may be, for example, a PDU session establishment request. The first message may be, for example, a PDU session modification request. Based on the first message, the SMF may determine whether to reject or accept the request for offloaded processing. The SMF may send, to the wireless device, a second message indicating a rejection or an acceptance of the request for offloaded processing of data. Having been provided with a S-NSSAI, the SMF may be able to quickly and efficiently arrange a suitable user plane path between the wireless device and an edge computing application server. For example, the user plane path that is determined may be suitable for the network slice indicated by the S-NSSAI. Accordingly, the wireless device may quickly realize the benefits of edge computing.

In an example, a wireless device may determine to send a request for offloaded processing of application data to an SMF. The request may be included in a first message that comprises a PDU session identifier. The PDU session identifier may identify a PDU session associated with the application. The first message may be, for example, a PDU session establishment request. The first message may be, for example, a PDU session modification request. Based on the first message, the SMF may determine whether to reject or accept the request for offloaded processing. The SMF may send, to the wireless device, a second message indicating a rejection or an acceptance of the request for offloaded processing of data. Having been provided with a PDU session identifier, the SMF may be able to quickly and efficiently arrange a user plane path between the wireless device and an edge computing application server. Accordingly, the wireless device may quickly realize the benefits of edge computing.

In an example, a wireless device may determine to send a request for offloaded processing of application data to an SMF. The request may be included in a PDU session establishment request. Based on the PDU session establishment request, the SMF may determine whether to reject or accept the request for offloaded processing. The SMF may send, to the wireless device, a second message indicating a rejection or an acceptance of the request for offloaded processing of data. Having been provided with the request for offloaded processing of application data, the SMF may be able to quickly and efficiently arrange a user plane path between the wireless device and an edge computing application server. Additional signaling between, for example, the wireless device and an application server of the application (e.g., a central application server and/or the edge computing application server) may be avoided. For example, the wireless device may avoid establishing a PDU session by which to communicate with the application server, and then sending a request for offloaded processing to the application server using the established PDU session, and then modifying an existing PDU session (or establishing a new PDU session) so that it is suitable for offloaded processing. Accordingly, signaling overhead in the network may be reduced and the wireless device may quickly realize the benefits of edge computing.

In an example, a wireless device may determine to send a request for offloaded processing of application data to an SMF. The request may be included in, for example, a first message comprising a PDU session establishment request. The request may be included in, for example, a first message comprising a PDU session modification request. The SMF may select one or more UPFs to serve the PDU session based on the request for offloaded processing of data. Having been notified that offloaded processing of data is requested, the SMF may be able to quickly and efficiently arrange a user plane path that is suitable for edge computing. Accordingly, the wireless device may quickly realize the benefits of edge computing.

In an example, a wireless device may determine to send a request for offloaded processing of application data to an SMF. The request may be included in, for example, a first message comprising a PDU session establishment request. The request may be included in, for example, a first message comprising a PDU session modification request. The SMF may select one or more UPFs to serve the PDU session based on the request for offloaded processing of data. Having been provided with a S-NSSAI, the SMF may be able to quickly and efficiently arrange a suitable user plane path between the wireless device and an edge computing application server. For example, the user plane path that is determined may be suitable for the network slice indicated by the S-NSSAI. Accordingly, the wireless device may quickly realize the benefits of edge computing.

In an example, the AF influence on traffic routing is enhanced to cover an exchange of computational capability/load of each application servers for an application. An application function of the application may send a message comprising one or more load status info of one or more application servers of the application to a session management function (SMF). The application function may send the message via a policy control function (PCF) and/or a network exposure function (NEF). The SMF may store the one or more load status info. The SMF may use the one or more load status info and the requesting the offloading for the application for a user plane function (UPF) selection for a packet data unit (PDU) session associated with the application. In the above, the SMF may determine whether the offloading is available or not based on the UPF selection. In an example, the SMF may determine that the offloading is available if the SMF selects a UPF with high load capacity.

Figure 21:
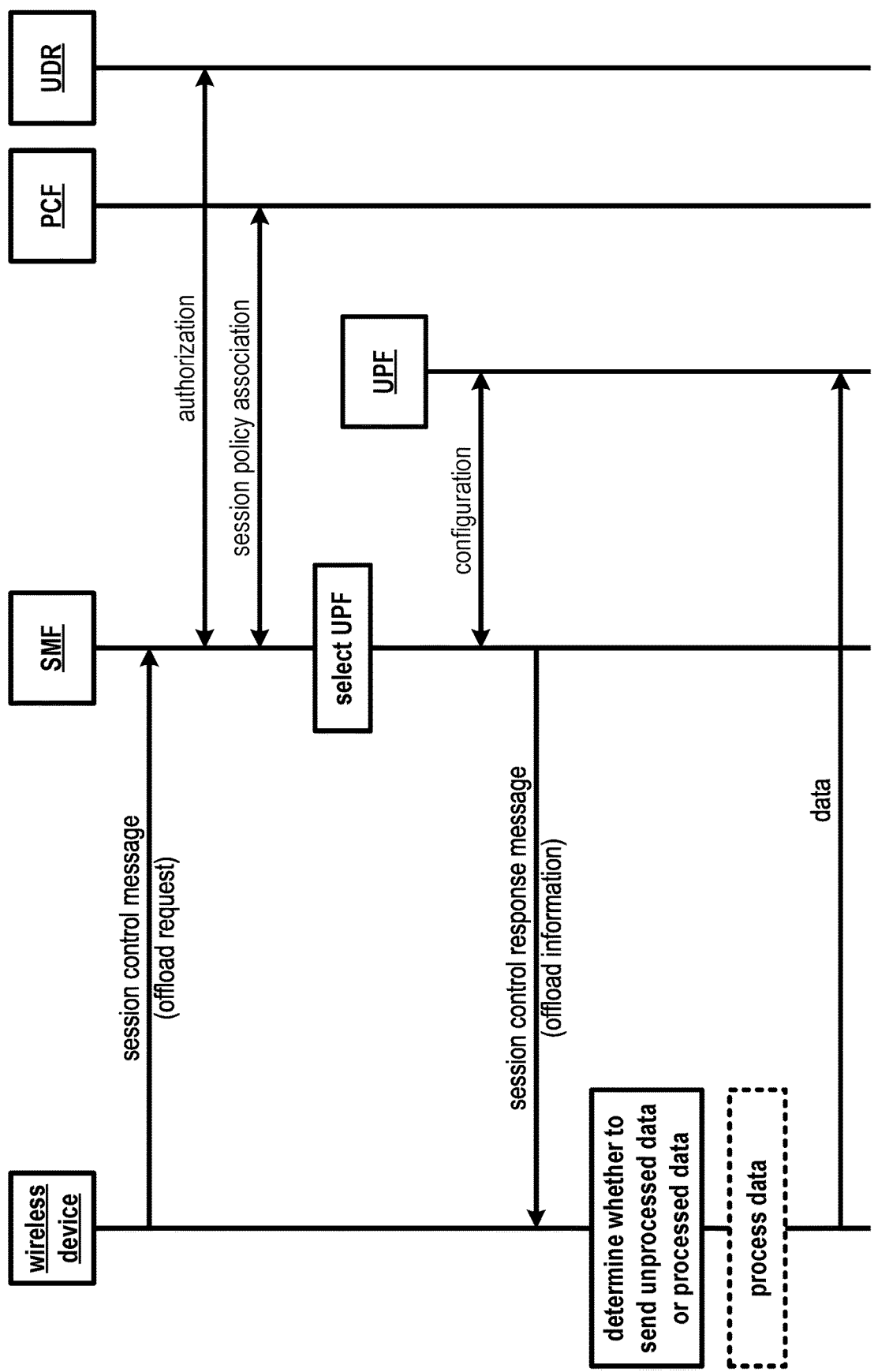
FIG. 21 illustrates a call flow for offload request and UPF selection in accordance with an example embodiment of the present disclosure.

FIG. 21 illustrates a call flow for offload determination and UPF selection in accordance with an example embodiment of the present disclosure. The figure illustrates a wireless device, a UPF, and several core network control plane functions (an SMF, a PCF, and a UDR). The wireless device may use a specific application. The application may be employed under an MEC environment. The wireless device may determine to use the application and request to establish a PDU session associated with the application. The wireless device may determine to offload processing tasks associated with the application and/or the PDU session. The wireless device may send, to the SMF, a session control message for the PDU session. The session control message may comprise an offload request. The offload request may be a request for offloading of computation and/or processing tasks to an application server. As an example, the session control message may request offloading of processing associated with the application and/or the PDU session.

In an example, the wireless device may request offloading based on at least one of a battery power level of the wireless device, computing resources of the wireless device, computing resources for the application of the wireless device, a radio quality with a serving base station, a wireless device capability, and/or the like.

In an example, the request for offloading may be based on a power level of the wireless device. As an example, the power level of a battery of the wireless device may be below a power level threshold (e.g., 20%), and the wireless device may determine to offload one or more processing tasks to the application server. The power level threshold may be determined by, for example, an operating system of the wireless device or a MEC layer of the wireless device. As an example, the user may activate a power saving mode of the wireless device and/or the application, and the wireless device may determine to offload one or more processing tasks to the application server.

In an example, the request for offloading may be based on computing resources of the wireless device. As an example, a utilization ratio of a computing capability of the wireless device may rise beyond a utilization ratio threshold (e.g., 50%), and the wireless device may determine to offload one or more processing tasks to the application server. As an example, the utilization ratio may be a percentage of the available computing resources associated with, for example, a central processing unit (CPU) or a graphics processing unit (GPU). As an example, the wireless device, or a component thereof (CPU, GPU, etc.), may be capable of a certain number of million instructions per second (MIPS), and the utilization ratio may correspond to a number of available MIPS. As an example, the utilization ratio may reflect an amount of computing resources allocated for processing tasks associated with the application. As an example, the utilization ratio may be a proportion of the amount of computing resources allocated for processing tasks associated with the application relative to an amount of unused computing resources and/or an amount of computing resources used for other processing tasks of the wireless device.

In an example, the request for offloading may be based on a radio quality with a serving base station. As an example, the radio quality may be above a radio quality threshold, and the wireless device may determine to offload one or more processing tasks to the application server. The radio quality with a serving base station may be measured as an RSRQ (Reference Signal Received Quality) and/or an RSRP (Reference Signal Received Power) of the serving base station. As an example, RSRQ of the serving base station may be above −3 dB, and the wireless device may determine to offload one or more processing tasks to the application server. As an example, RSRP of the serving base station may be above −44 dB, and the wireless device may determine to offload one or more processing tasks to the application server. The radio quality threshold may be preconfigured by a wireless device or provided by a MEC layer of the wireless device. The wireless device may receive the radio quality threshold from the serving base station. The serving base station may broadcast the radio quality threshold for the offloading or may send via a message (for example, an RRC message) to the wireless device.

In an example, the request for offloading may be based on a computation capability of the wireless device. The wireless device may be simple display without enough computational power for the application. In an example, the wireless device may comprise a display and a simple CPU so the wireless device may not capable for the computing for a processing of the application. The need of the offloading may be based on the wireless device capability. In an example, the need of the offloading may be based on the wireless device being a display for interacting with the application of the MEC. In an example, the need of the offloading may be based on the wireless device being a low complexity wireless device. The wireless device may determine to offload a processing or storage/caching task pertaining to an application.

In an example, the network may determine an offload scheme based on the wireless device status, network load, and/or the like. The offload scheme may be transmitted to the wireless device to instruct the wireless device on processing, storage/caching, transmission (e.g., determining a preferred access type), and/or the like for the running application.

In an example, the session control message may be a PDU session establishment request message, a PDU session modification request message, a service request message, and/or the like. The session control message may comprise a DNN of the application and/or an S-NSSAI of the application. The session control message may comprise information for requesting offload, facilitating offload, determining whether offload is viable, and/or determining whether offload is efficient. The session control message may comprise a power level of the wireless device, computing resources associated with the wireless device (used by the wireless device, unused by the wireless device, used by the application, available to the wireless device, etc.), a radio quality (RSRQ, RSRP of a serving base station, etc.), the wireless device capability, a number of applications, types of applications running on the wireless device, and/or the like.

The SMF may receive the session control message requesting offload. The SMF may check an authorization of the wireless device with a UDR. In an example, the SMF may check whether the application is authorized to be used by the wireless device. The SMF may check with the UDR whether the application is authorized to use offloading and/or an offloading level of the application. In an example, the offloading may be authorized for the wireless device based on a subscription information of the UDR, local policy, and/or the like. In an example, the offloading level of the application or the wireless device may comprise no offloading, partial offloading (corresponding to offloading of particular processing tasks and/or a fraction of all processing tasks), full offloading, and/or the like. The SMF may check the authorization of the offloading, the offloading level based on pre-configuration and/or a local policy. If the wireless device is authorized for the offloading, the SMF may determine the offloading of the wireless device based on the request from the wireless device.

In an example, the SMF may establish a session policy association with the PCF. The SMF may receive QoS parameter for the wireless based on the DNN, S-NSSAI, and/or the like. The QoS parameter may comprise at least one of 5G QoS Identifier (5QI), application and retention priority, reflective QoS attribute, flow bit rates, maximum packet loss rate, aggregate bit rates, and/or the like. In an example, the SMF may select a UPF for the PDU session.

In response to receiving the session control message, the SMF may select a serving UPF for the PDU session. The SMF may select the serving UPF based on at least one of a DNN, an S-NSSAI, a location of the wireless device, a serving base station, load status information of the UPF, load status information of one or more application functions, the offloading request, the authorization result of the computation, and/or the like. Although only a single UPF is illustrated, it will be understood that selection of the UPF may comprise selection of a user plane path to a particular application server (application function). The user plane path may comprise any number of UPFs. The any number of UPFs may communicate with one another using N9 interfaces.

In an example, the authorization result of the offloading may indicate that the offloading is not allowed for the wireless device and/or the application. In response to the offloading being not allowed, the SMF may select the UPF based on the DNN, S-NSSAI and the location of the wireless device. In response to the offloading being not allowed, the SMF may select the UPF based on the available resources of the UPF, information about path performance between the UPF and the wireless device (e.g., delay, number of hops, and/or the like), etc. In an example, if the wireless device location corresponds to a particular DNAI, the SMF may select a UPF that is associated with the DNAI. The association information between the DNAI and the UPF may be configured by an AF that is influencing traffic routing, for example, the AS controller described above.

In an example, the authorization result of the offloading may indicate that the offloading is allowed for the wireless device and/or the application. In an example, the SMF may determine to offload computing of the wireless device to an application server based on the offloading request received from the wireless device. In an example, the SMF may determine to offload computing of the wireless device to an application server based on the offloading request received from the wireless device and the indication that offloading is allowed for the wireless device. In response to determining to offload computing of the wireless device, the SMF may select the UPF based on the DNN, S-NSSAI, a location of the wireless device, a serving base station, load status information of one or more application functions, and/or the like. In an example, the SMF may select UPF based on a location of the wireless device (e.g., area associated with the DNAI). The SMF may additionally consider load status information of one or more application functions for the UPF selection.

In an example, UPF 1 and UPF 2 may be associated with the DNAI-1 which is a location of the wireless device. In an example, the load status of application function associated with the UPF 1 may indicate that offloading is not possible. In an example, the load status of application function associated with the UPF 2 may indicate that offloading is possible. The SMF may select the UPF 2 in response to the offloading being possible.

In an example, UPF 1 and UPF 2 may be associated with the DNAI-1 which is a location of the wireless device. In an example, the load status of application function associated with the UPF 1 may indicate that 70% of computing power is used. In an example, the load status of application function associated with the UPF 2 may indicate that 50% of computing power is used. The SMF may select the UPF 2 in response to the offloading being possible.

In an example, UPF 1 may be associated with the DNAI-1 and UPF 2 may be associated with the DNAI-2 and the wireless device may locate close to the DNAI-1. A load status of a first application function associated with the DNAI-1 may indicate that offloading is not possible. A load status of a second application function associated with the DNAI-2 may indicate that offloading is possible. A user plane path, from the wireless device, to the UPF 2 may provide longer delay than a user plane path, from the wireless device, to the UPF 1. The SMF, based on the offloading request, may select the UPF 2 for the PDU session in response to the offloading of the second application associated with the UPF 2 being possible.

In an example, the SMF may determine whether the offloading for the PDU session of the wireless device is available or not. The SMF may determine whether the offloading is available or not based on at least one of DNN, S-NSSAI, a location of the wireless device, a serving base station, load status information of one or more application functions, the offloading request, the authorization result of the offloading, selected UPF, and/or the like.

If the authorization result of the offloading indicates that the offloading is not allowed for the wireless device and/or the application, the SMF may determine that the offloading is not available for the wireless device. If an application (e.g., application function, application system, application server) associated with the selected UPF does not support offloading (e.g., based on the load status information) or is not capable of offloading, the SMF may determine that the offloading is not available for the PDU session.

If the authorization result of the offloading indicates that the offloading is allowed for the wireless device and/or the application, the SMF may determine that the offloading is available for the wireless device. If an application (e.g., application function, application system, application server) associated with the selected UPF supports offloading (e.g., based on the load status information), or is capable of offloading, the SMF may determine that the offloading is available for the PDU session. If the SMF selects a UPF of a local data network (e.g., local area data network), the SMF may determine that the offloading is available.

In an example, the SMF may send, to the wireless device, a session control response message for the PDU session indicating whether the offloading is available or not. The SMF may send the session control response message based on the determination of the offloading. The session control response message may be a PDU session establishment accept message, a PDU session modification message, a PDU session modification response message, and/or the like.

In an example, the wireless device may receive the session control response message for the PDU session, from the SMF, indicating whether the offloading is available or not. If the session control response message indicates that the offloading is available, the wireless device may determine to offload computing of the application associated with the PDU session to an application function of a data center. The wireless device may determine to offload computing fully or partially. If the session control response message indicates that the offloading is available, the wireless device may determine to send data that is unprocessed by the application of the wireless device. If the wireless device sends data that is unprocessed by the application to an application of a data center via the 5G system (e.g., base station to UPF), the application of the data center may process the data.

In an example, the session control response message may indicate that the offloading is not available. If the offloading is not available, the wireless device may determine do not offload computing of the application associated with the PDU session to an application of a data center. The wireless device may determine local computing without offloading to the application of the data center. If the session control response message indicates that the offloading is not available, the wireless device may determine to send data that is processed by the application of the wireless device.

In an example, the session control response message may further indicate an offloading level for the application. The offloading level may comprise a full offload, semi offload, partial offload, and/or the like. If the offloading level indicates semi offload or partial offload, the wireless device may determine to offload partially. If the wireless device determines to offload partially, the wireless device may send data that is unprocessed and data that is processed. If the wireless device determines to offload partially, the wireless device may send data that is unprocessed and data that is processed.

In an example, the session control response message may further indicate a location of an application server. The location of the application sever may comprise a center data network, a local data network, an edge data network, and/or the like. The wireless device may send the data that is unprocessed based on that the location of an application server is the local data network or the edge data network. The wireless device may determine to offload computing (e.g., computing power) based on that the location of an application server is the local data network or the edge data network.

Figure 22:
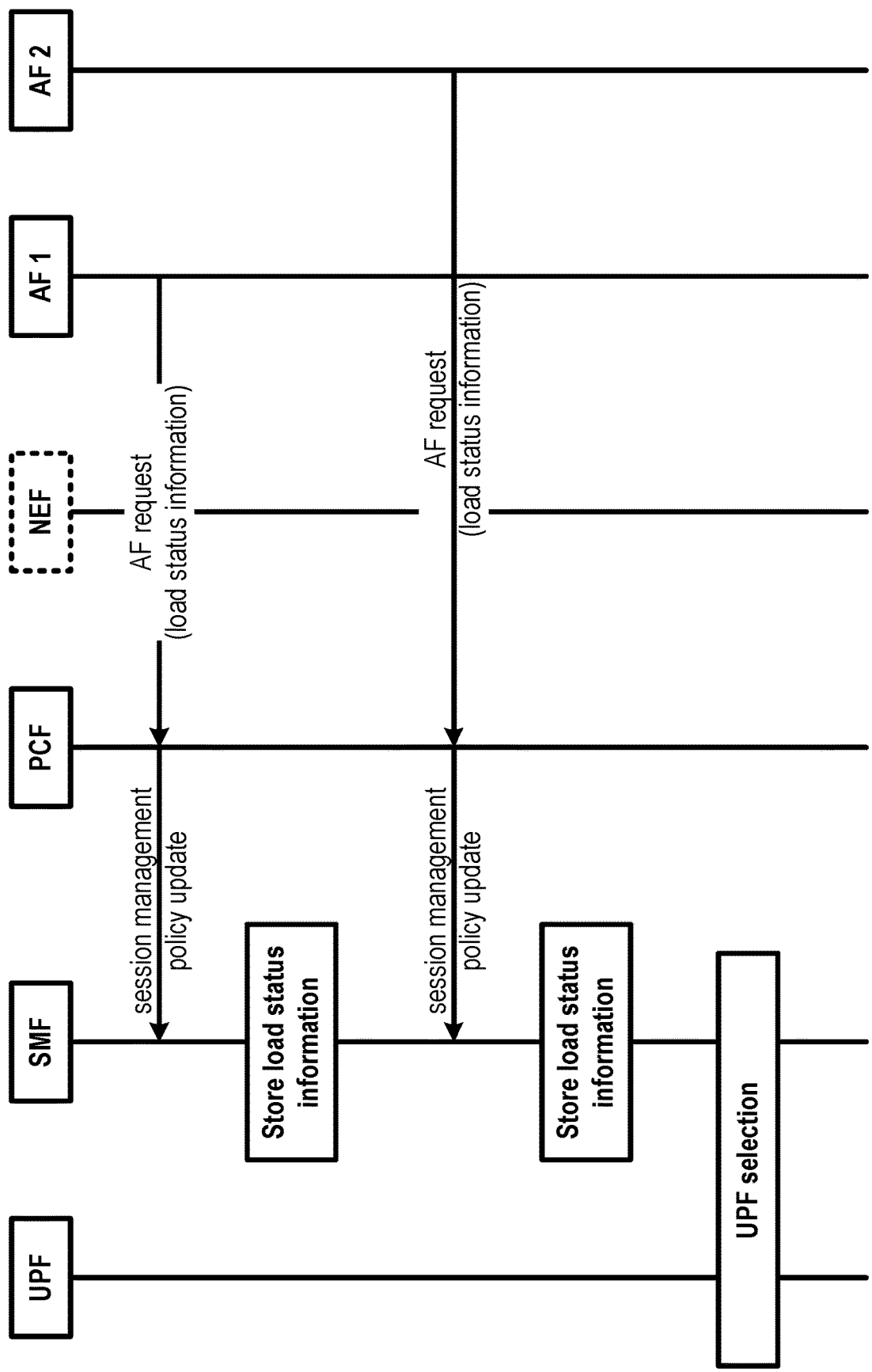
FIG. 22 illustrates a call flow for load status info report procedure from an application function in accordance with an example embodiment of a present disclosure.

FIG. 22 illustrates a call flow for load status info report procedure by an AS controller in accordance with an example embodiment of the present disclosure. The figure illustrates a UPF, several core network control plane functions (an SMF, a PCF, and a UDR) and two application function (AF1, AF2). In an example, each application function may be a AS controller.

The application function may send an AF request to the SMF. The AF request may comprise DNAI address, application function address, load status information, and/or the like. In an example, the load status information may be an offloading capability. The load status information may indicate an availability of the offloading from the application. The load status information may comprise, for example, a percentile of computation resource usage of the application function (50%, 70%). The load status information may indicate full offloading, partial offloading, no offloading, and/or the like. The load status information may indicate an idle resource of the application. The SMF may receive a first load status info from an application function 1. The SMF may receive a second load status info from an application function 2. The SMF may store the first and second load status info internally.

In an example, a wireless device requests a PDU session establishment requesting offloading. In response to the requesting, the SMF may determine a UPF selection for a PDU session based on the first and second load status info.

If the load status of the application function 1 indicates a full offloading and the load status of the application function 2 indicates a partial offloading, the SMF may select a UPF associated with the application function 1.

Figure 23:
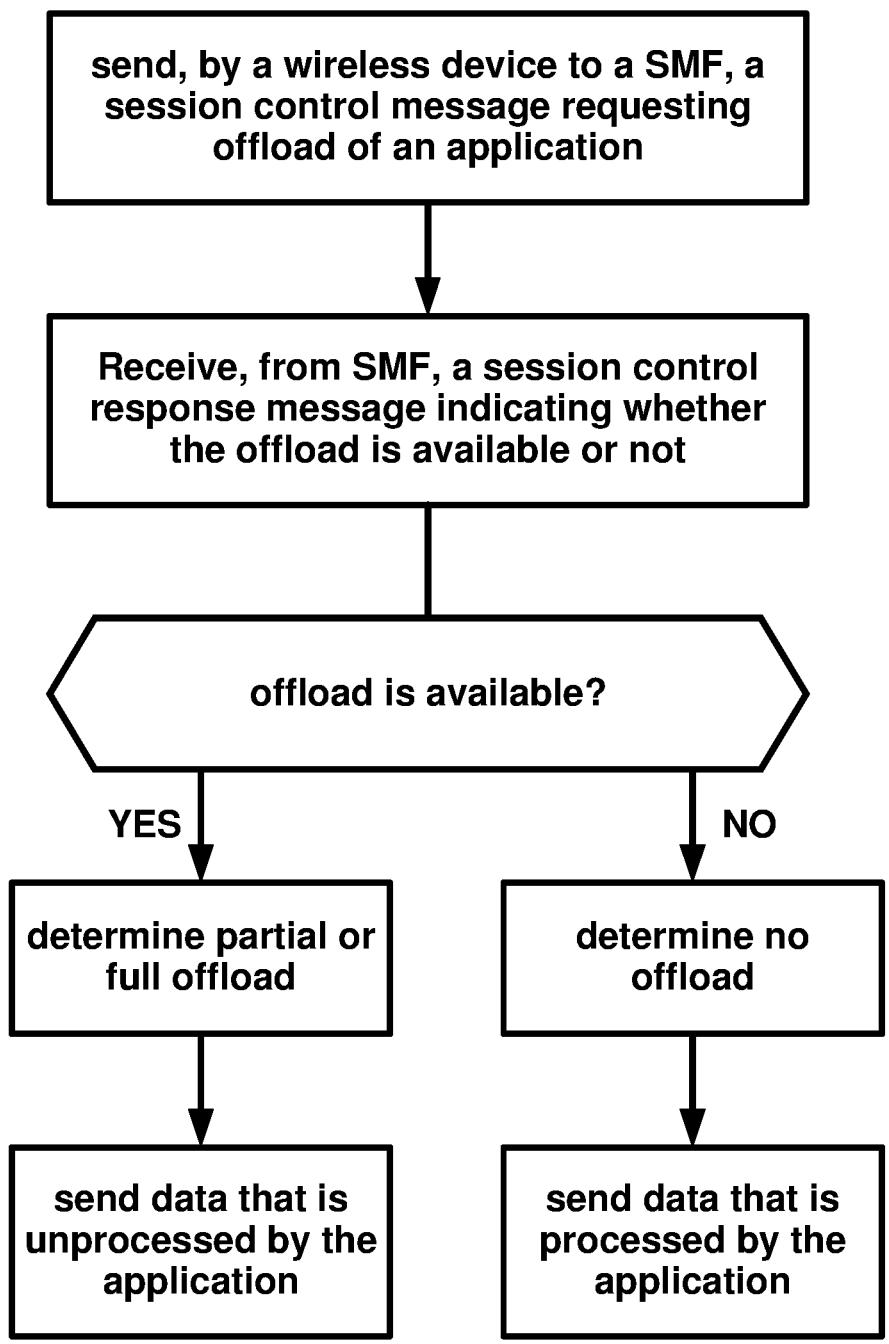
FIG. 23 illustrates a flow chart for a wireless device in accordance with an example embodiment of the present disclosure.

FIG. 23 illustrates a flow chart for a wireless device in accordance with an example embodiment of the present disclosure. In an example, a wireless device may send a session control message, to an SMF, requesting offload of an application. The wireless device may receive a session control response message in response to sending the session control message. The session control response message may indicate whether the offload is available or not. If the offload is available, the wireless device may determine a partial or full offload. The wireless device may send data that is unprocessed by the application, in response to the offload being available. In the present disclosure, the term unprocessed data may refer to data that is not fully processed to obtain the result, including raw data or partially-processed data. If the offload is not available, the wireless device may determine a local computing. The wireless device may send data that is processed by the application, in response to the offload not being available.

Figure 24:
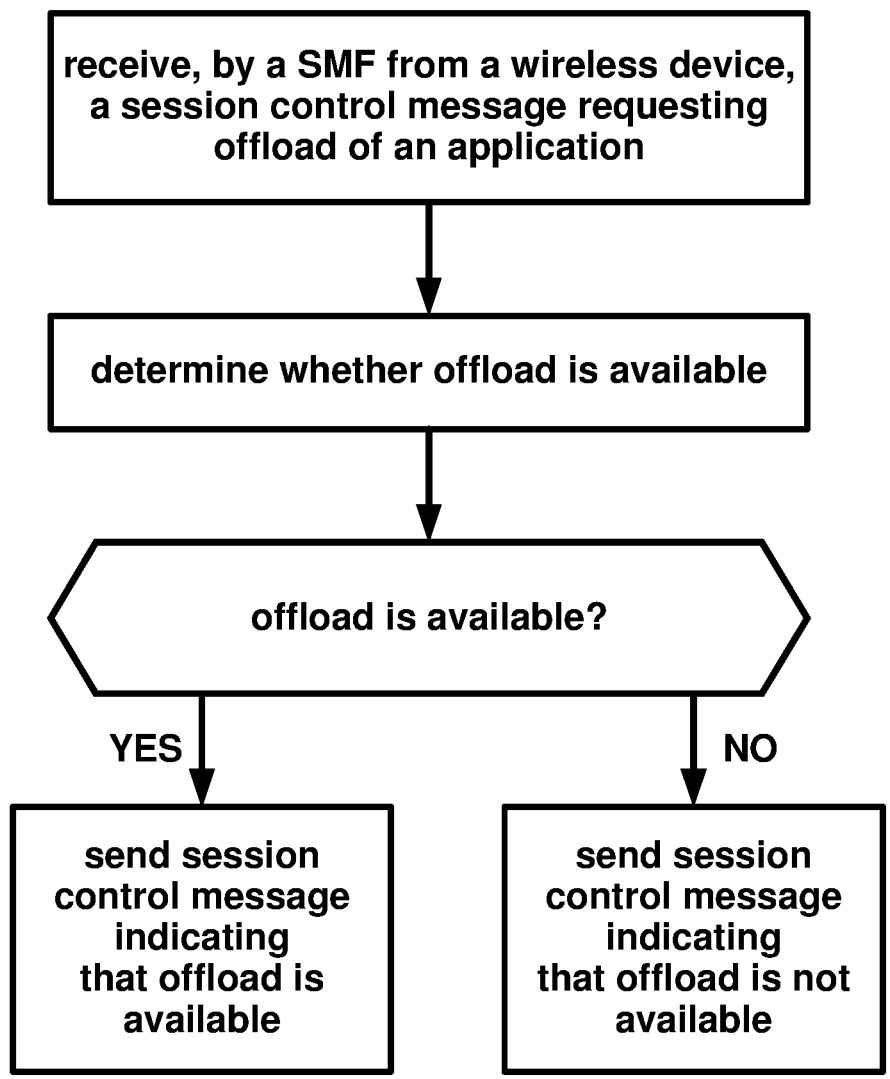
FIG. 24 illustrates a flow chart for an SMF in accordance with an example embodiment of the present disclosure.

FIG. 24 illustrates a flow chart for an SMF in accordance with an example embodiment of the present disclosure. In an example, a SMF may receive a session control message, from a wireless device, requesting offload of an application. The SMF may determine whether offload is available or not. If offload is available based on the determination, the SMF may send a session control response message indicating that offload is available. If the offload is not available based on the determination, the SMF may send a session control response message indicating that offload is not available.

Figure 25:
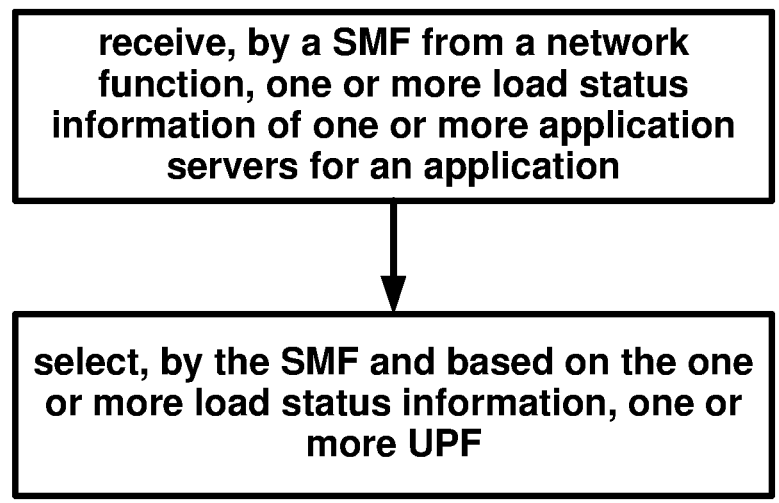
FIG. 25 illustrates a flow chart for an SMF regarding a UPF selection in accordance with an example embodiment of the present disclosure.

FIG. 25 illustrates a flow chart for an SMF regarding a UPF selection in accordance with an example embodiment of the present disclosure. In an example, a SMF may receive one or more load status information of one or more application servers for an application, from a network function. The SMF may select one or more UPFs based on the one or more load status information. The network function may be an application function (e.g., application function of MEC, MEC controller, and/or the like).

In an example, a wireless device may send, to a session management function (SMF), a session control message for a packet data unit (PDU) session requesting an offloading for an application of the wireless device. The wireless device may receive from the SMF, a session control response message for the PDU session indicating that the offloading is available. The wireless device may send data that is unprocessed by the application of the wireless device, based on the indication that the offloading is available.

In an example, offloading may refer to offloading of one or more processing tasks, and may be referred to as computation offloading, task offloading, and/or processing offloading.

In an example, a wireless device may send, to a session management function (SMF), a session control message for a packet data unit (PDU) session, wherein the session control message requests an offloading for an application of the wireless device. The wireless device may receive from the SMF, a session control response message for the PDU session indicating whether the offloading is available or not. The wireless device may send data that is unprocessed by the application of the wireless device, based on the indication that the offloading is available. In an example, the wireless device may send data that is processed by the application of the wireless device, based on the indication that the offloading is not available. In an example, the offloading may be an offloading.

In an example, the wireless device may request the offloading based on at least one of a battery power level, a computing resources, a computing resources for the application, a radio quality with a serving base station, a wireless device capability, and/or the like. The battery power level of the wireless device may below a power threshold. The computing resources of the wireless device may below a computing resources threshold. The radio quality with the serving base station may be above a radio quality threshold. The wireless device may be low complexity wireless device. The wireless device may be authorized for the offloading.

In an example, the session control response message may further indicate an offloading level for the application whether the offloading level is a full offload or a semi/partial offload. The sending the data that is unprocessed may be further based on the offloading level. The session control response message may further indicate a location of an application server whether the application server locates at center or edge of a network. The sending of the data that is unprocessed may be further based on the location of the application server.

In an example, a session management function (SMF) may receive from a wireless device, a session control message for a packet data unit (PDU) session, wherein the session control message requests an offloading for an application of the wireless device. The SMF may determine whether the offloading is available or not. The SMF may send to the wireless device, a session control response message for the PDU session indicating whether the offloading is available or not based on the determining.

In an example, the SMF may select a UPF for the PDU session based on the offloading request. The SMF may receive from a first application server (AS) which is associated with the application, a first message indicating a first computing load status of the first AS. The SMF may receive from a second AS which is associated with the application, a second message indicating a second computing load status of the second AS. The SMF may select the UPF based on the first computing load status and the second computing load status. In an example, the SMF may select a user plane function (UPF) associated to the first application in response to the first offloading status being higher than that the second offloading status. In an example, the first message may comprise at least one of the first computing load status, one or more data network access identifier (DNAI)s associated with the first AS, and/or the like.

In an example, the session control message for the PDU session may further comprise at least one of computing power of the wireless device, energy consumption information, and/or the like.

In an example, the determining may be further based on at least one of remaining battery of the wireless device, amounts of the unprocessed data, and/or the like.

In an example, the session control response message may further comprise a location of AS of the wireless device. The location of AS may indicate at least one of a center of the network, an edge of the network, a local area network, and/or the like.

The wireless device may determine to send data that is unprocessed in response to the wireless device selecting a remote computing in an AS of the application.

The AS may locate in an edge network for the wireless device.

The wireless device may determine to send data that is processed in response to the wireless device selecting a local computing inside the wireless device.

The wireless device may send to the SMF, a session modification message requesting a modification of quality of service (QoS) requirement for the application. The sending the session modification message may be based on the determining.

In an example, a session management function (SMF) may receive from a first application function (AF) of an application, a first message indicating a first load status of the first AF, wherein the first message comprising a first offloading capability of the first AF. The SMF may receive a second application function (AF) of the application, a second message indicating a second load status of the second AF, wherein the second message comprising a second offloading capability of the second AF. The SMF may receive from a wireless device, a third message request a packet data unit (PDU) session setup for the application. The SMF may determine and based on the first message and the second message, to select a first user data function (UPF) associated with the first AF.

In an example, a session management function (SMF) may receive from an application function (AF) of an application, a message comprising at least one of, a first load status of the application associated with a first data network access identifier (DNAI), a second load status of the application associated with a second DNAI, and/or the like. The SMF may receive from a wireless device, a third message request a packet data unit (PDU) session setup for the application. The SMF may determine and based on the first load status and the second load status, to select a first user data function (UPF) associated with the first DNAI.

In an example, the first load status may indicate higher computing capability than the second load status.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent.

For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by a session management function (SMF) from a wireless device, a packet data unit (PDU) session establishment request message requesting:
      establishment of a PDU session associated with an application; and
      processing of data associated with the application, the processing being offloaded from the wireless device to an application server associated with the application; and
   in response to receiving the PDU session establishment request message, sending, to the wireless device, a response message indicating a rejection or an acceptance of the processing being offloaded from the wireless device.

2. The method of claim 1, further comprising selecting, by the SMF, a user plane function (UPF) to serve the PDU session.

3. The method of claim 2, wherein the UPF is associated with at least one data network access identifier linking the UPF to the application server associated with the application.

4. The method of claim 3, further comprising receiving, from the application server associated with the application, load status information of the application server; and wherein the load status information indicates at least one of full offloading, partial offloading, or no offloading.

5. The method of claim 4, wherein the selecting the UPF is based on the load status information of the application server.

6. The method of claim 1, wherein the response message indicates one or more of:
   the rejection of the processing of the data;
   the acceptance of a partial offload of the processing of the data; and
   the acceptance of a full offload of the processing of the data.

7. The method of claim 1, wherein the response message is a PDU session establishment accept message.

8. The method of claim 1, wherein the PDU session establishment request message comprises one or more of single network slice selection assistance information (S-NSSAI) of the PDU session and a PDU session identifier of the PDU session.

9. The method of claim 8, wherein:
   the PDU session establishment request message comprises the S-NSSAI of the PDU; and
   the response message comprises the S-NSSAI of the PDU session.

10. The method of claim 1, wherein:
    the PDU session establishment request message comprises a PDU session identifier of the PDU session; and
    the response message comprises the PDU session identifier of the PDU session.

11. A session management function (SMF) comprising one or more processors and memory storing instructions that, when executed by the one or more processors, cause the SMF to:
    receive, from a wireless device, a packet data unit (PDU) session establishment request message requesting:
       establishment of a PDU session associated with an application; and
       processing of data associated with the application, the processing being offloaded from the wireless device to an application server associated with the application; and
    in response to receiving the PDU session establishment request message,
    send, to the wireless device, a response message indicating a rejection or an acceptance of the processing being offloaded from the wireless device.

12. The SMF of claim 11, wherein the instructions further cause the SMF to select a user plane function (UPF) to serve the PDU session.

13. The SMF of claim 12, wherein the UPF is associated with at least one data network access identifier linking the UPF to the application server associated with the application.

14. The SMF of claim 13, wherein the instructions further cause the SMF to receive, from the application server associated with the application, load status information of the application server; and wherein the load status information indicates at least one of full offloading, partial offloading, or no offloading.

15. The SMF of claim 14, wherein the selecting the UPF is based on the load status information of the application server.

16. The SMF of claim 11, wherein the response message indicates one or more of:
    the rejection of the processing of the data;
    the acceptance of a partial offload of the processing of the data; and
    the acceptance of a full offload of the processing of the data.

17. The SMF of claim 11, wherein the response message is a PDU session establishment accept message.

18. The SMF of claim 11, wherein the PDU session establishment request message comprises one or more of single network slice selection assistance information (S-NSSAI) of the PDU session and a PDU session identifier of the PDU session.

19. The SMF of claim 11, wherein:
    the PDU session establishment request message comprises a PDU session identifier of the PDU session; and
    the response message comprises the PDU session identifier of the PDU session.

20. A system, comprising:
    a session management function (SMF) comprising: one or more first processors and first memory storing instructions that, when executed by the one or more first processors, cause the SMF to:
       receive, from a wireless device, a packet data unit (PDU) session establishment request message requesting:
          establishment of a PDU session associated with an application; and
          processing of data from the wireless device associated with the application, the processing being offloaded to an application server associated with the application; and in response to receiving the PDU session establishment request message,
send, to the wireless device, a response message indicating a rejection or an acceptance of the processing being offloaded from the wireless device; and the wireless device comprising: one or more second processors and second memory storing instructions that, when executed by the one or more second processors, cause the wireless device to:
send, to the SMF, the PDU session establishment request message; and
receive, from the SMF, the response message.

\* \* \* \* \*